(12) United States Patent
Hanzawa et al.

(10) Patent No.: US 9,279,618 B2
(45) Date of Patent: Mar. 8, 2016

(54) KILN TOOL PLATE FOR FIRING CERAMIC MATERIAL

(75) Inventors: Shigeru Hanzawa, Kagamigahara (JP); Tsuneo Komiyama, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 723 days.

(21) Appl. No.: 12/869,123

(22) Filed: Aug. 26, 2010

(65) Prior Publication Data
US 2011/0039221 A1 Feb. 17, 2011

Related U.S. Application Data

(63) Continuation of application No. PCT/JP2009/053810, filed on Mar. 2, 2009.

(30) Foreign Application Priority Data

Mar. 5, 2008 (JP) .................. 2008-054662

(51) Int. Cl.
*F27D 5/00* (2006.01)
*B28B 11/24* (2006.01)
(Continued)

(52) U.S. Cl.
CPC ............ *F27D 5/0012* (2013.01); *B28B 11/248* (2013.01); *C04B 35/565* (2013.01); *C04B 35/6316* (2013.01); *C04B 35/64* (2013.01); *C04B 2235/3418* (2013.01);
(Continued)

(58) Field of Classification Search
CPC .. B28B 11/248; C04B 35/6316; C04B 35/64; C04B 35/565; C04B 2235/3418; C04B 2235/3873; C04B 2235/77; C04B 2235/80; C04B 2235/945; C04B 2235/95; C04B 2235/96; C04B 2235/9623; C04B 2235/428

USPC .......................................... 432/258
See application file for complete search history.

(56) References Cited

U.S. PATENT DOCUMENTS 2,882,032 A * 4/1959 Garner ..................... 432/241
3,589,694 A * 6/1971 Gelling et al. ............ 432/261
(Continued)

FOREIGN PATENT DOCUMENTS

CN 1408678 A 4/2003
CN 2783236 Y 5/2006
(Continued)

OTHER PUBLICATIONS

JP05-003897U—machine translation.*
(Continued)

*Primary Examiner* — Alissa Tompkins
*Assistant Examiner* — Nathaniel Herzfeld
(74) *Attorney, Agent, or Firm* — Burr & Brown, PLLC

(57) ABSTRACT

A kiln tool plate for firing a ceramic material used during the firing of an article to be fired, where at least uneven conformations are imparted to a front surface side on which the article to be fired is mounted and a back surface side, and opening areas are formed. In the ceramic material firing kiln tool plate, the decrease of heat capacity and the reduction of costs can be achieved, a contact area with the article to be fired is decreased to improve outgassing, and the atmosphere can be made uniform to uniformly manufacture the fired article. Above all, the kiln tool plate for firing the ceramic material has excellent thermal shock resistance, creep resistance, high strength at high temperature and oxidation resistance, and enables weight saving.

13 Claims, 16 Drawing Sheets

(51) Int. Cl.
*C04B 35/565* (2006.01)
*C04B 35/63* (2006.01)
*C04B 35/64* (2006.01)

(52) U.S. Cl.
CPC .. *C04B 2235/3873* (2013.01); *C04B 2235/428* (2013.01); *C04B 2235/77* (2013.01); *C04B 2235/80* (2013.01); *C04B 2235/945* (2013.01); *C04B 2235/95* (2013.01); *C04B 2235/96* (2013.01); *C04B 2235/9623* (2013.01)

(56) References Cited

U.S. PATENT DOCUMENTS

| | | | | |
|---|---|---|---|---|
| 3,739,921 | A * | 6/1973 | Schmidt | 211/194 |
| 4,141,681 | A * | 2/1979 | Lovatt | 432/258 |
| 4,185,956 | A * | 1/1980 | Balster | 432/258 |
| 4,315,738 | A * | 2/1982 | Lovatt | 432/258 |
| 6,162,544 | A * | 12/2000 | Hanzawa | 428/408 |
| 6,644,966 | B1 * | 11/2003 | Chiang | 432/253 |
| 6,705,860 | B2 * | 3/2004 | Fukushima et al. | 432/261 |
| 2002/0042037 | A1 * | 4/2002 | Fukushima et al. | 432/179 |
| 2003/0054120 | A1 | 3/2003 | Nakano et al. | |
| 2006/0035194 | A1 | 2/2006 | Nakano et al. | |
| 2006/0281625 | A1 | 12/2006 | Kinoshita et al. | |
| 2007/0144561 | A1 | 6/2007 | Saijo et al. | |
| 2008/0142149 | A1 * | 6/2008 | Noguchi et al. | 156/89.22 |

FOREIGN PATENT DOCUMENTS

| | | |
|---|---|---|
| DE | 103 12 802 B3 | 7/2004 |
| GB | 1 240 204 A | 7/1971 |
| JP | 56-155297 U | 11/1981 |
| JP | 03-223167 A1 | 10/1991 |
| JP | 04-117395 U | 10/1992 |
| JP | 05-003897 U | 1/1993 |
| JP | 05-003897 U1 | 1/1993 |
| JP | 05-017261 A1 | 1/1993 |
| JP | 06-045209 A1 | 2/1994 |
| JP | 06-191944 A1 | 7/1994 |
| JP | 06-281359 A1 | 10/1994 |
| JP | 07-098185 A1 | 4/1995 |
| JP | 10-054672 A1 | 2/1998 |
| JP | 11-079852 A1 | 3/1999 |
| JP | 2000-009389 A1 | 1/2000 |
| JP | 2004-115324 A1 | 4/2004 |
| JP | 2005-082451 A1 | 3/2005 |
| JP | 2007-205696 A1 | 8/2007 |

OTHER PUBLICATIONS

Chinese Office Action dated Sep. 29, 2012 (with English translation).
Japanese Office Action dated Jul. 9, 2013 (with English translation).
Chinese Office Action dated May 17, 2013.
Chinese Decision of Rejection, with English Translation, Chinese Application No. 200980107969.6, dated Nov. 7, 2013 (13 pages).
Extended European Search Report (Application No. 09718023.6) dated Jun. 26, 2014.
Chinese Notification of Reexamination (Application No. 200980107969.6) dated Dec. 12, 2014 (with English translation).

* cited by examiner

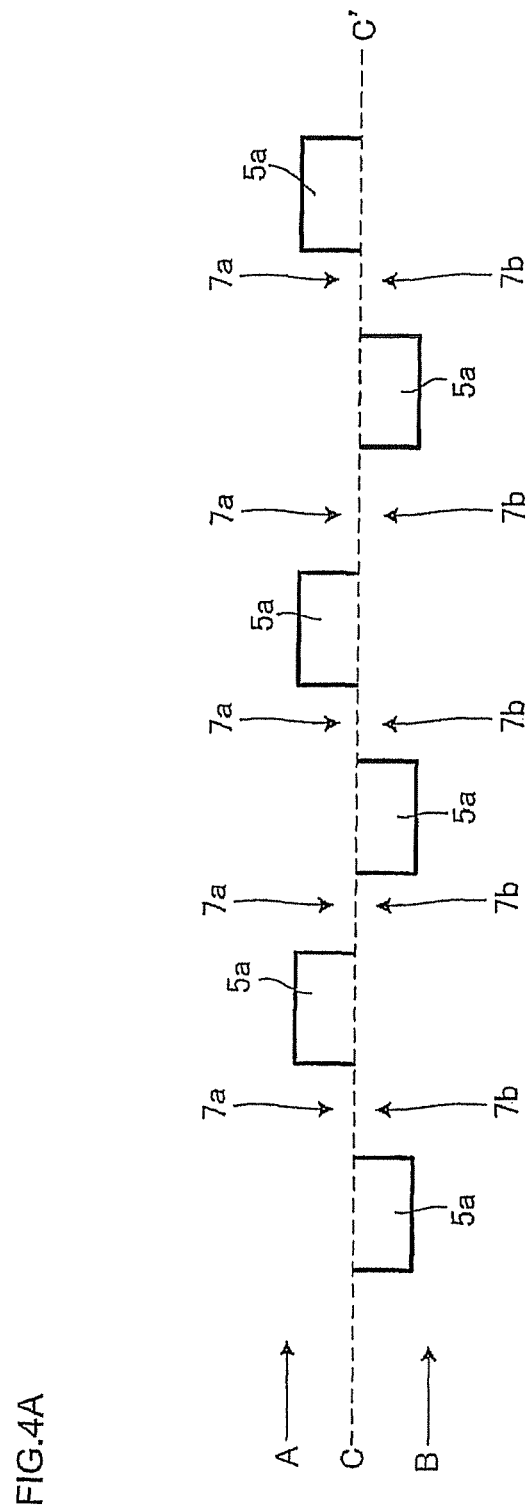

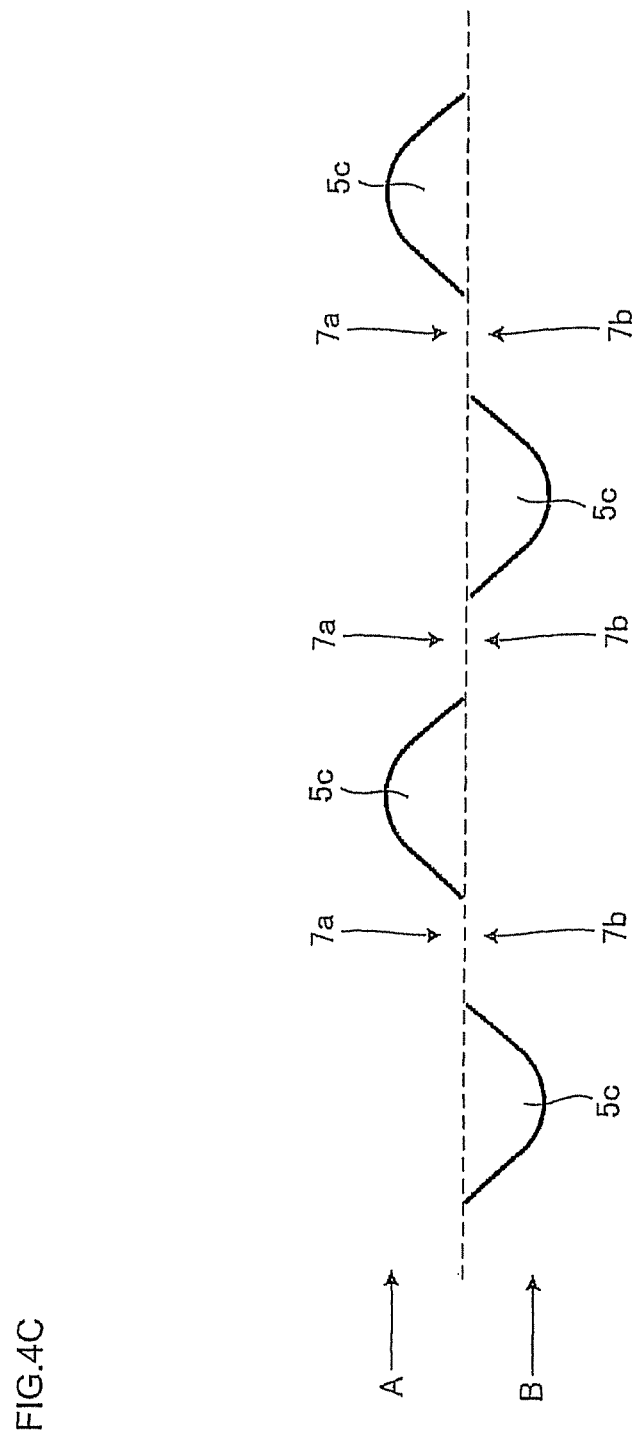

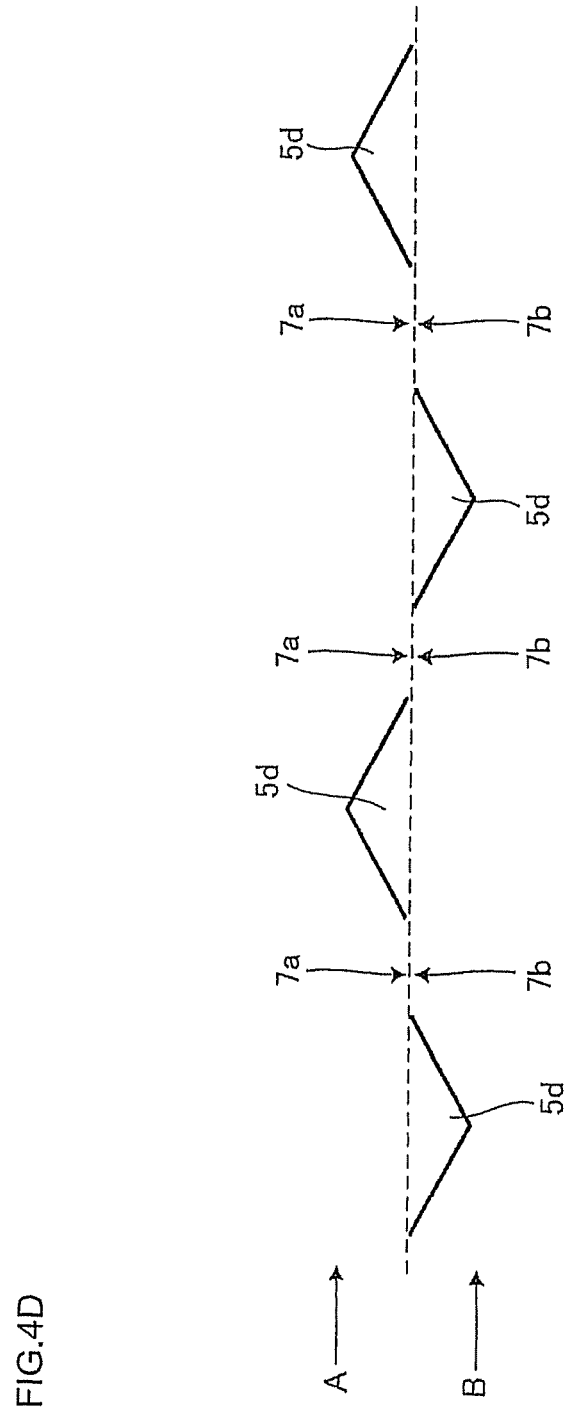

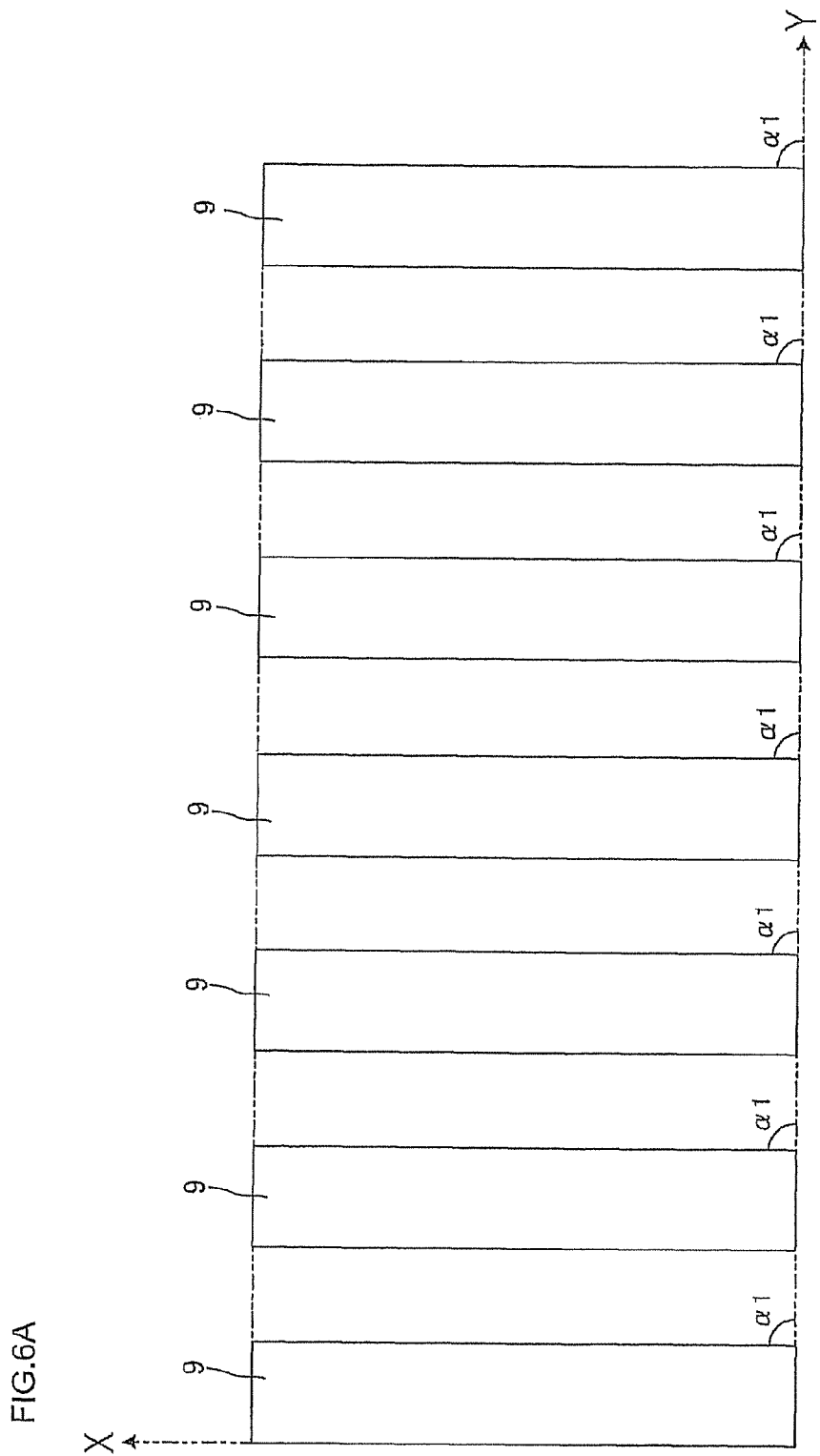

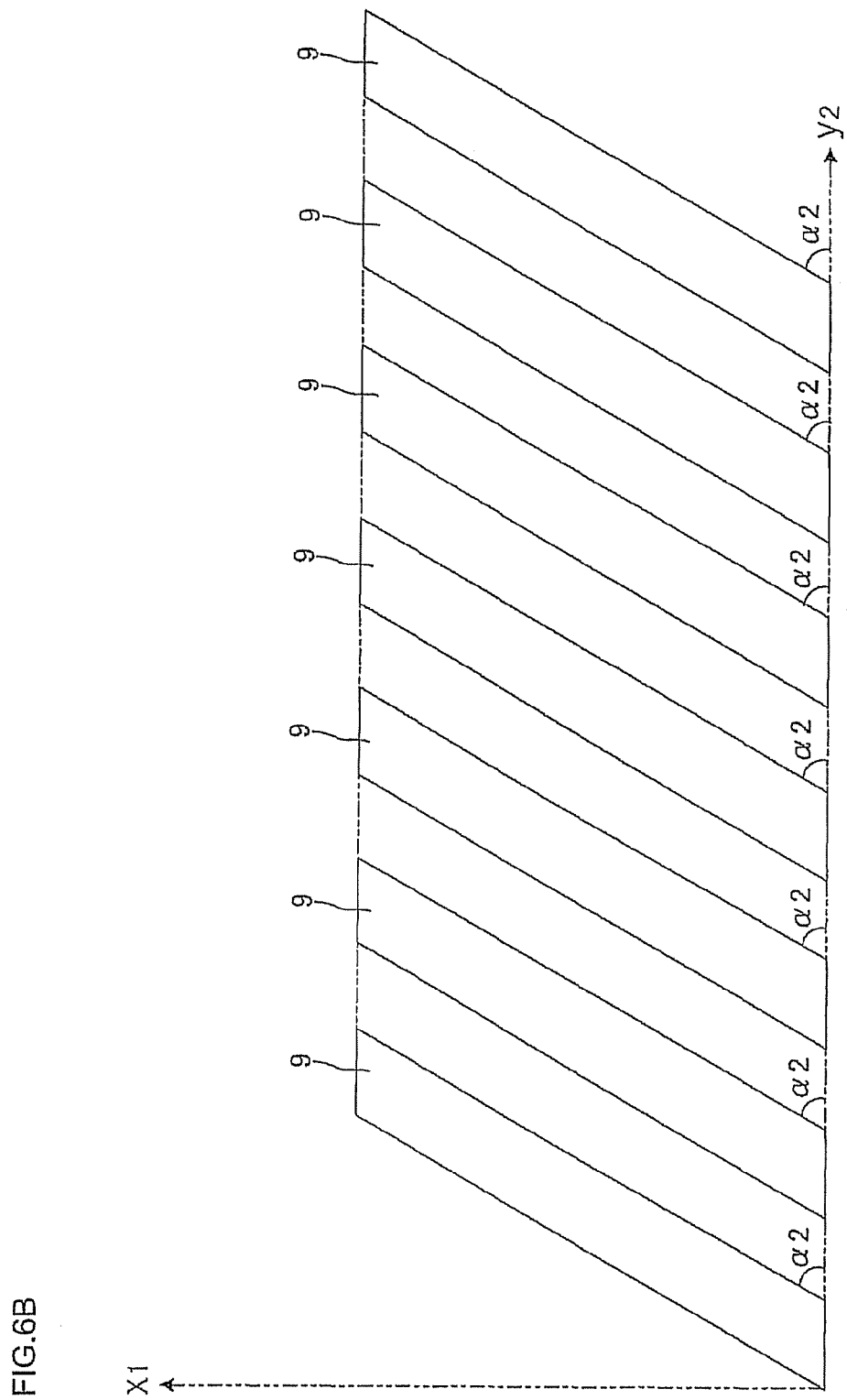

KILN TOOL PLATE FOR FIRING CERAMIC MATERIAL

BACKGROUND OF THE INVENTION

1. Field of the Invention

The present invention relates to a lightweight setter. More particularly, it relates to a lightweight setter for a shelf assembly having a beam structure used to fire a formed honeycomb article.

2. Description of Related Art

Heretofore, as a ceramic material firing kiln tool plate used during the firing of an article to be fired such as a formed honeycomb article, there has been known a ceramic material firing kiln tool plate which comes in contact with the article to be fired and which has a plate shape.

However, when the article to be fired is mounted and fired on the ceramic material firing kiln tool plate having the plate shape, a binder gas included in the article to be fired is not easily discharged, thereby causing a problem that a temperature difference occurs in a product to generate a breakage defect, or another problem that a binder residue during the firing hampers sintering to generate the breakage defect.

Moreover, owing to a large contact area, the binder gas is not easily discharged. In addition, the contact with an atmospheric gas becomes insufficient during the firing, and hence the atmosphere is confined, with the result that the breakage defect is generated. Furthermore, the article is deformed owing to contraction during the sintering to generate the breakage defect. The article easily adheres to a setter owing to the contraction during the sintering, which also generates a problem such as a crack or breakage defect.

To solve such problems, Patent Documents 1 to 3 are suggested as follows.

Patent Document 1 employs a firing kiln tool plate in which a ceramic porous material having pore diameters of about 0.5 to 4 mm is disposed as a supporter, and a surface layer of a surface-like ceramic porous material having bore diameters of 0.5 mm or less is formed on one surface of the supporter. In consequence, a gas permeability to a decomposed gas or the like generated from a lightweight half-finished product is secured, and the thermal strain of the finished product is prevented. In Patent Document 1, however, the ratio of the weight of a kiln tool with respect to a product weight is large, and a large loss takes place from the aspect of energy saving. Moreover, the binder gas is not sufficiently discharged during the firing, so that a temperature difference in the product still easily occurs, and a breakage defect is easily generated. Moreover, the atmosphere is easily confined, and the contact of the product with the atmospheric gas becomes insufficient during the firing, and the breakage defect is further easily generated. Therefore, any concrete countermeasure is not taken against the above problems.

Patent Document 2 is characterized in that a kiln tool plate is constituted of a base plate made of a ceramic material and a plurality of penetration holding portions provided on the ceramic base plate to separately hold electronic parts, respectively, and the shape of each of the penetration holding portions is tapered so that the sectional area thereof decreases from the upper surface to the lower surface. Moreover, the cross section of the penetration holding portion has such a size that at least the electronic part does not pass therethrough. The ceramic base plate of Patent Document 2 employs such a tapered shape that the sectional area decreases from the upper surface to the lower surface, to pass the atmospheric gas through all the holding portions, which is evaluated highly to a certain degree. However, the ratio of the weight of a kiln tool with respect to a product weight is large, a large loss is incurred from the aspect of energy saving, and a binder gas is not sufficiently discharged during firing. Moreover, owing to a large contact area with a product, the product is easily deformed owing to contraction during sintering, and might adhere to the ceramic base plate. In addition, the possibility of the occurrence of a fluctuation during manufacturing, for example, a crack or breakage defect, cannot be denied.

In Patent Document 3, a surface mount portion having an uneven surface structure is formed on the surface of a ceramic base member which comes in contact with an article to be fired, whereby the flow of hot air on a jig can be made uniform to uniformly fire the article to be fired. When such a constitution is employed, the flow of the hot air on the jig can be made uniform to a certain degree. The constitution is evaluated highly to a certain degree. However, it cannot be considered that a binder gas is sufficiently discharged during firing. Moreover, an atmospheric gas is easily confined. In addition, the ratio of the weight of a kiln tool with respect to a product weight is large, and a large loss is incurred from the aspect of energy saving. It cannot be considered that a countermeasure is sufficiently taken against deformation or the like due to contraction during sintering.

As described above, the above problems are not sufficiently solved at present, and a further improvement is demanded.

Patent Document 1: JP-A-5-17261
Patent Document 2: JP-A-6-45209
Patent Document 3: JP-A-6-281359

SUMMARY OF THE INVENTION

The present invention has been developed to solve the above problems, and an object thereof is to provide a kiln tool plate for firing a ceramic material in which at least uneven conformations are imparted to a front surface side with an article to be fired mounted thereon and a back surface side and in which opening areas are formed, whereby heat capacity decrease and cost reduction can be achieved. There is provided a kiln tool plate for firing a ceramic material in which a contact area with an article to be fired is decreased to improve outgassing and in which the atmosphere can be made uniform to uniformly manufacture the fired article. Above all, there is provided a kiln tool plate for firing a ceramic material having excellent thermal shock resistance, creep resistance, high strength at high temperature and oxidation resistance while enabling weight saving.

According to the present invention, a kiln tool plate for firing a ceramic material can be provided as follows.

[1] A kiln tool plate for firing a ceramic material which is used during the firing of an article to be fired, wherein at least uneven conformations are imparted to a front surface side on which the article to be fired is mounted and a back surface side, and opening areas are formed.

[2] The kiln tool plate for firing the ceramic material according to [1], wherein the opening areas are formed as first recess portions in recess portions of the uneven conformation imparted to the front surface side and formed as second recess portions in recess portions of the uneven conformation imparted to the back surface side, and the opening areas of the first recess portions are communicated with the opening areas of the second recess portions, respectively.

[3] The kiln tool plate for firing the ceramic material according to [1] or [2], wherein the uneven conformations formed on the front surface side and the back surface side are obtained by arranging rod-like portions in parallel with and away from one another.

[4] The kiln tool plate for firing the ceramic material according to [3], wherein the arrangement angle of the rod-like portions on the front surface side is shifted from that of the rod-like portions on the back surface side to form the uneven conformations on the front surface side and the back surface side in such a manner that the uneven conformations are shifted from each other.

[5] The kiln tool plate for firing the ceramic material according to [4], wherein the rod-like portions are formed so as to be arranged at positions of 30 to 60 degrees with respect to a long axis of the kiln tool plate for firing the ceramic material.

[6] The kiln tool plate for firing the ceramic material according to any one of [2] to [5], wherein the opening areas formed in the first recess portions and the second recess portions, respectively, are formed so as to be shifted from one another while communicated with one another.

[7] The kiln tool plate for firing the ceramic material according to any one of [3] to [6], wherein the sectional shape of each of the rod-like portions is selectable from the group consisting of a quadrangular shape, a trapezoidal shape, a curved shape and a triangular shape.

[8] The kiln tool plate for firing the ceramic material according to any one of [1] to [7], wherein when a value obtained by dividing a solid volume by a volume calculated from a maximum outer diameter dimension is defined as a solid volume ratio and the area of a communication pore is defined as a communication opening ratio, the solid volume ratio is in a range of 5 to 80 mass %, the communication opening ratio is in a range of 20 to 80%, and the contact area of one surface which comes in contact with the article to be fired is in a range of 2 to 80%.

[9] The kiln tool plate for firing the ceramic material according to any one of [1] to [8], which contains at least 50 mass % of SiC.

[10] The kiln tool plate for firing the ceramic material according to any one of [1] to [8], which contains at least 90 mass % of SiC and $Si_3N_4$ in total.

[11] The kiln tool plate for firing the ceramic material according to any one of [1] to [8], which contains 85 to 90 mass % or more of SiC and 15 to 10 mass % or more of $SiO_2$.

The present invention produces an excellent effect that there can be provided the kiln tool plate for firing the ceramic material in which heat capacity decrease and cost reduction can be achieved, the contact area with the article to be fired is decreased to improve outgassing, and the atmosphere can be made uniform to uniformly manufacture the fired article. Above all, there can be provided the kiln tool plate for firing the ceramic material having excellent thermal shock resistance, creep resistance, high strength at high temperature and oxidation resistance.

BRIEF DESCRIPTION OF THE DRAWINGS

FIG. 4A is an exemplary diagram of the kiln tool plate for firing the ceramic material of the present embodiment and a sectional view showing a cross section cut along the C-C' line of FIG. 2;

FIG. 4C is an exemplary diagram and a sectional view showing another example of the uneven conformation shown in FIG. 4A;

FIG. 4D is an exemplary diagram and a sectional view showing still another example of the uneven conformation shown in FIG. 4A;

FIG. 6A is an exemplary diagram showing one example of an arrangement angle of the rod-like portions arranged on the front surface side (or the back surface side) of the kiln tool plate for firing the ceramic material of the present embodiment;

FIG. 6B is an exemplary diagram showing another example of the arrangement angle of the rod-like portions arranged on the front surface side (or the back surface side) of the kiln tool plate for firing the ceramic material of the present embodiment;

Figure 1:
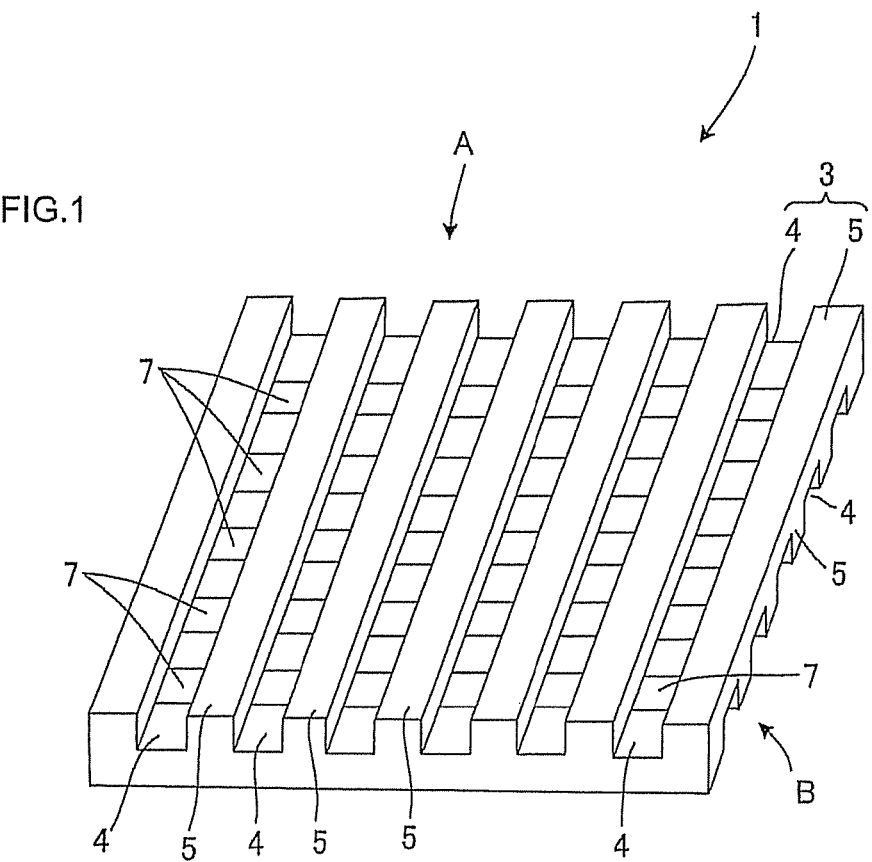
FIG. 1 is a perspective view schematically showing a kiln tool plate for firing a ceramic material of the present embodiment.

DESCRIPTION OF REFERENCE NUMERALS 1 and 1A: kiln tool plate for firing ceramic material, 3: uneven conformation, 4: recess portion, 5, 5a, 5b, 5c, 5d and 5e: projection portion, 7, 7a and 7b: opening area, 9: rod-like portion, 11: frame, 12: shelf assembly, 13: support, 14: mounting base, 15: bridging member, 16: shelf assembly, 17: support, 18: mounting base, 100: formed honeycomb article, A: front surface side (of kiln tool plate for firing ceramic material), B: back surface side (of kiln tool plate for firing ceramic material), H1: front surface opening ratio, H2: back surface opening ratio, I: communication opening ratio (of communication pore), J: reference line, X and X1: short axis (width direction) of kiln tool plate for firing ceramic material, Y and Y2: long axis (longitudinal direction) of kiln tool plate for firing ceramic material, and Z: virtual line.

DETAILED DESCRIPTION OF THE INVENTION

Hereinafter, the best mode for carrying out a kiln tool plate for firing ceramic material of the present invention will specifically be described. However, the present invention broadly includes the kiln tool plate for firing ceramic material comprising inventive specific matters thereof, and is not limited to the following embodiment.

[1] Constitution of Kiln Tool Plate for Firing Ceramic Material of the Present Invention:

As shown in FIG. 1, a kiln tool plate for firing a ceramic material of the present invention is a ceramic material firing kiln tool plate 1 used to fire an article to be fired, and is characterized in that at least uneven conformations 3 are imparted to a front surface side A on which the article to be fired is mounted and a back surface side B and that opening areas 7 are formed.

Figure 10A:
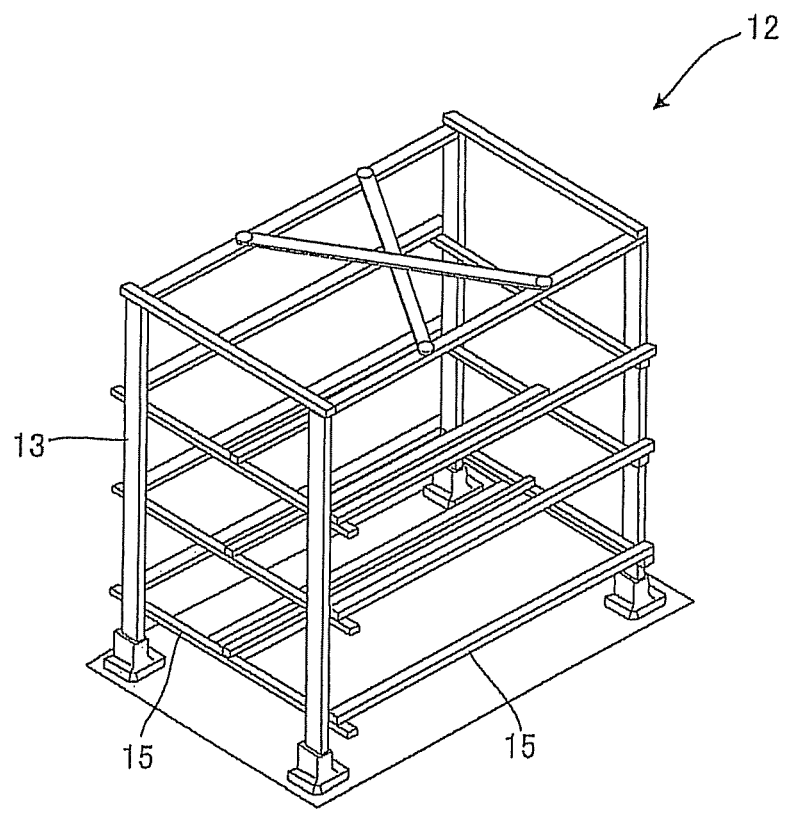
FIG. 10A is a perspective view schematically showing a shelf assembly in which the kiln tool plate for firing the ceramic material of the present embodiment is used.
Figure 10B:
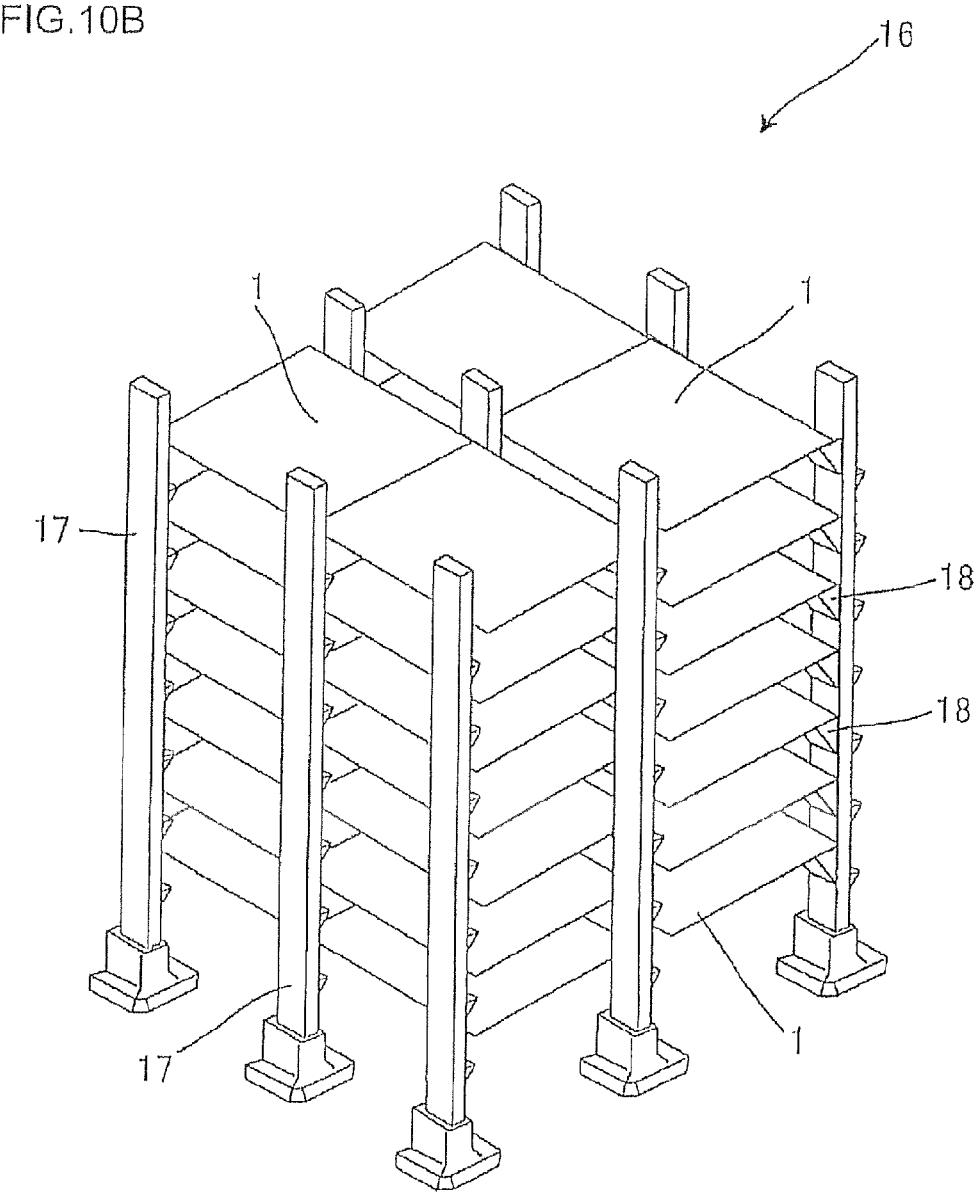
FIG. 10B is a perspective view schematically showing another configuration of the shelf assembly in which the kiln tool plate for firing the ceramic material of the present embodiment is used, and a diagram showing that the kiln tool plates for firing the ceramic material of the present embodiment are arranged.

It is to be noted that the kiln tool plate for firing the ceramic material is used as a shelf of a shelf assembly in the present embodiment, so that an article to be fired such as a honeycomb structure is mounted on the shelf, and fired by a kiln or the like and manufactured (see FIGS. 10A and 10B). However, the present invention is not limited to the use for such a shelf assembly, and can suitably be used in a case where an article to be fired such as the honeycomb structure is mounted and fired by the kiln or the like. Moreover, the kiln tool plate for firing the ceramic material can suitably be used to fire the articles to be fired, for example, the honeycomb structure, and additionally electroceramic materials such as a capacitor, a Soft Ferrite and a PTC, a powder metal, and the like.

[1-1] Front Surface:

The front surface of the kiln tool plate for firing the ceramic material of the present embodiment is the surface of the kiln tool plate for firing the ceramic material on which an article to be fired is mounted, and this front surface is formed so that an uneven conformation is imparted thereto. This is because during firing, the front surface formed in this manner does not serve as a so-called bottom lid of the honeycomb structure so that the discharge of a gas is not disturbed. That is, in the present embodiment, the uneven conformation is imparted, whereby recess portions of the shape can become so-called gas loopholes (passages) to discharge the gas to the outside, thereby eliminating such a problem.

Moreover, when the contact area of the honeycomb structure or the like with the front surface of the firing kiln tool plate increases, contracting deformation easily occurs owing to a temperature variation after the firing. If this contracting deformation excessively occurs, crack is generated, or adhering to the firing kiln tool plate easily occurs. Furthermore, obtained honeycomb structures noticeably fluctuate. However, in the present embodiment, the uneven conformation can be imparted to decrease the contact area, whereby various problems due to the contracting deformation can be prevented.

Here, the imparted uneven conformation is constituted of a combination of projecting portions and the recess portions. The projecting portions are constituted as regions for supporting the article to be fired from the downside, and the recess portions are constituted as outflow paths of a gas generated from the above article to be fired and as through channels where the atmosphere is applied to the article to be fired. The shapes of such projecting and recess portions are preferably appropriately selected as follows.

Figure 2:
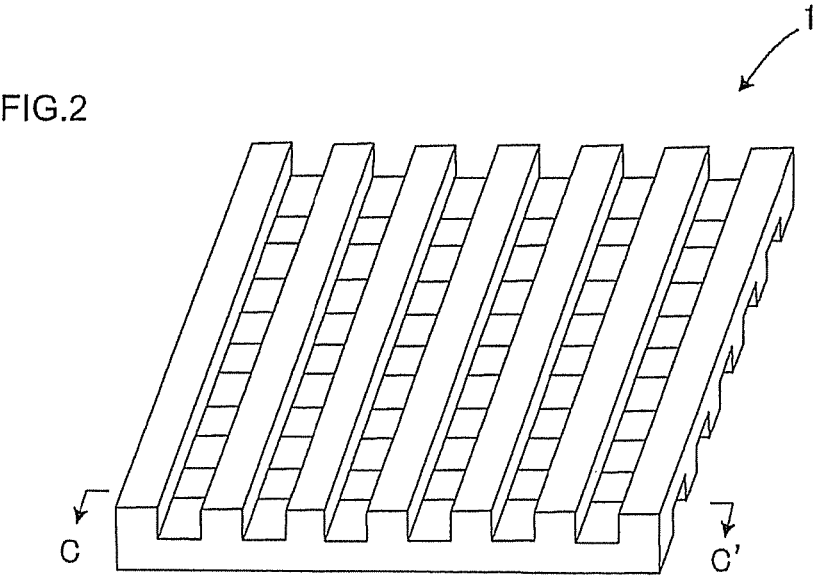
FIG. 2 is a perspective view schematically showing the kiln tool plate for firing the ceramic material of the present embodiment.
Figure 3A:
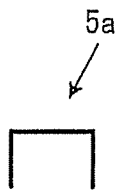
FIG. 3A is a partially enlarged diagram of FIG. 2 and an exemplary diagram showing another example of the shape of each projecting portion shown in FIG. 2.
Figure 3B:
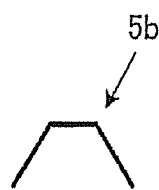
FIG. 3B is a partially enlarged diagram of FIG. 2 and an exemplary diagram showing still another example of the shape of the projecting portion shown in FIG. 2.
Figure 3C:
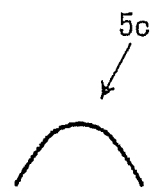
FIG. 3C is a partially enlarged diagram of FIG. 2 and an exemplary diagram showing a further example of the shape of the projecting portion shown in FIG. 2.
Figure 3D:
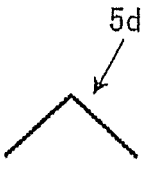
FIG. 3D is a partially enlarged diagram of FIG. 2 and an exemplary diagram showing a further example of the shape of the projecting portion shown in FIG. 2.
Figure 3E:
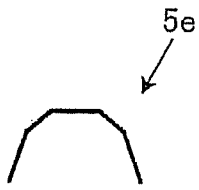
FIG. 3E is a partially enlarged diagram of FIG. 2 and an exemplary diagram showing a still further example of the shape of the projecting portion shown in FIG. 2.

As shown in, for example, FIGS. 3A to 3E, examples of the shape of each projecting portion include a quadrangular sectional shape of a projecting portion 5a, a trapezoidal sectional shape of a projecting portion 5b, a curved sectional shape of a projecting portion 5c, a triangular sectional shape of a projecting portion 5d and a polygonal sectional shape of a projecting portion 5e. It is to be noted that FIGS. 3A to 3E are partially enlarged diagrams of the kiln tool plate for firing the ceramic material shown in FIG. 2, and are exemplary diagrams showing the other examples of the shape of the projecting portion shown in FIG. 2.

Here, the article to be fired contracts when fired, and hence the contact of the article with the recess and projecting portions preferably decreases as much as possible. On the other hand, if the contact with the recess and projecting portions decreases excessively, a non-contact portion of the article to be fired might bend owing to its own weight. Therefore, from the viewpoint of balance between the article and the portions, the trapezoidal shape of the projecting portion 5b is more preferable as the shape of the recess/projecting portion.

Examples of the sectional shape of each recess portion include the sectional shapes of a groove such as a V-shaped groove or a U-shaped groove having a slope gradient formed at an acute angle, an obtuse angle or a right angle, a groove having a slope provided with a stepped portion and a recess portion having a horizontally symmetric or horizontally asymmetric slope (gradient).

In this way, the uneven conformation of the recess and projecting portions is appropriately selected and imparted as required, whereby the gas loopholes can be secured, and the contact area of the honeycomb structure with the front surface on which the honeycomb structure is mounted can be decreased. Furthermore, a structure having excellent thermal shock resistance, creep resistance, high strength at high temperature and oxidation resistance is obtained, which additionally enables weight saving.

Furthermore, opening areas are formed on the front surface side of the kiln tool plate for firing the ceramic material of the present embodiment. By the formed opening areas together with the recess portions which are the loopholes of the gas generated during the firing, the gas is easily discharged to the outside of the honeycomb structure, with the result that the gas is not confined in the honeycomb structure. Therefore, the rise of a firing temperature can be suppressed, and damages due to the crack or the deformation can be prevented. Furthermore, the atmosphere is easily applied to the article to be fired, and the fluctuation of the obtained honeycomb structure also decreases.

More preferably, as shown in FIG. 1, the opening areas 7 are formed in the inner bottoms of the recess portions. As compared with opening areas formed in the projecting portions, in the opening areas formed in the inner bottoms of the recess portions, a convection phenomenon or the like which might occur in so-called spaces of the recess portions during the firing facilitates the discharge of a gas such as a binder gas to the outside of the honeycomb structure. In consequence, the gas preferably cannot easily be confined in the honeycomb structure. Moreover, heat transmission, convective heat conduction, radiant heat conduction and the like can be performed with a good balance, respectively, and temperature control such as temperature raising during the firing or cooling after the firing is advantageously easily performed.

Here, the inner bottom of the recess portion is a portion formed by a member disposed on the front surface side and a member disposed on the back surface side, and the portion is depressed from the projecting portion on the front surface side to the center of the kiln tool plate for firing the ceramic material. Furthermore, when a boundary portion between the front surface side and the back surface side of the kiln tool plate for firing the ceramic material is a reference line, the recess portion is depressed on a reference side, to form the through channel of the gas. The opening areas are provided partially in the inner bottoms of the recess portions. Therefore, when the opening areas are formed, the gas is easily discharged, and the effect of the present invention can be exerted.

Specifically, as shown in FIG. 1, a recess portion 4 may be formed between projecting portions 5 constituting a part of the uneven conformation 3.

More preferably, the opening areas on the front surface side are communicated with the opening areas on the back surface side. Also when the opening areas formed on the front surface side and the opening areas formed on the back surface side are formed independently of one another without being communicated with one another, a gas such as the binder gas included in a fired article such as the honeycomb structure can be discharged to the outside of the honeycomb structure. However, when the opening areas formed in the front surface and the back surface are communicated with one another, the spaces of the opening areas can be enlarged, the convective phenomenon during burning easily occurs, and the generated gas is further easily discharged. Moreover, the atmosphere can uniformly be applied to the honeycomb structure, whereby the firing temperature becomes uniform, and excessive temperature rise can easily be controlled. Therefore, deformation can be prevented, and the fluctuation of the obtained honeycomb structure can preferably be decreased.

When opening areas 7a on the front surface side are communicated with opening areas 7b on the back surface side as shown in, for example, FIG. 4A, the effect of the present invention can preferably further be exerted.

Moreover, in the uneven conformation formed on the front surface side, rod-like portions are preferably arranged in parallel with and away from one another. When the rod-like portions are first formed, the uneven conformation can easily be formed.

Here, 'the rod-like portions are arranged in parallel with and away from one another' means that the adjacent projecting portions are arranged away from each other while arranging the projecting portions in parallel with each other, and 'arranged in parallel with' means that the portions are not arranged in a vertical direction but are arranged in a horizontal direction. The projecting portions are formed in this manner, because if the projecting portions are not formed (arranged) away from one another but are attached to one another, any recess portion is not formed. Even if the recess portions are formed, the recess portions have insufficient dimensions for forming the loopholes of the gas, whereby the gas is confined in the honeycomb structure, and the atmosphere is not applied over the fired article. Furthermore, if the projecting portions are attached to one another or are not arranged sufficiently away from one another, the contact areas of the projecting portions with the fired article mounted thereon increase, and the fired article is easily deformed. It is to be noted that a horizontal state is not strictly demanded as the above horizontal direction, and horizontality may be required to such an extent that the article to be fired is stably mounted.

When the rod-like portions are arranged in parallel with and away from one another, a distance between the adjacent rod-like portions is preferably appropriately selected in accordance with the dimensions of the rod-like portions. When a shelf has a typical size of a vertical size of 300 to 700 mm×a lateral size of 300 to 700 mm×a thickness of 5 to 10 mm, the rod-like portion is preferably disposed from about 5 to 10 mm (approximately equal to the thickness) away from the adjacent rod-like portion. It is to be noted that the present invention is not limited to such a size, and a suitable dimension can be employed as required.

Figure 5A:
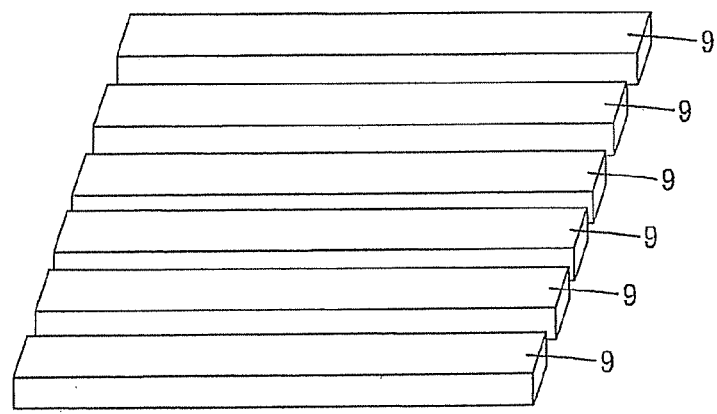
FIG. 5A is an exemplary diagram showing an arrangement example of rod-like portions arranged on the back surface side of the kiln tool plate for firing the ceramic material of the present embodiment.
Figure 5B:
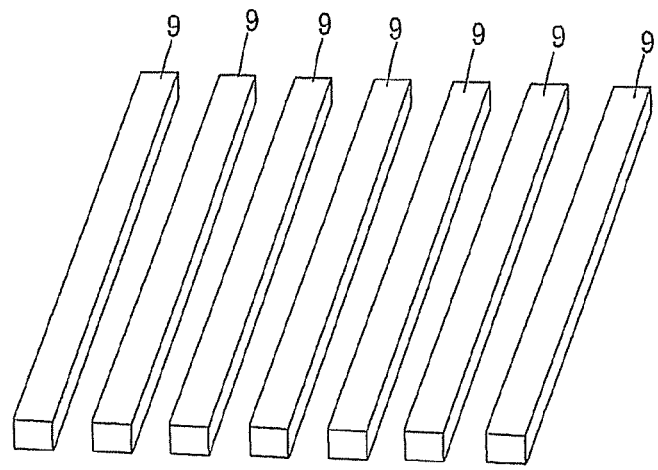
FIG. 5B is an exemplary diagram showing another arrangement example of rod-like portions arranged on the front surface side of the kiln tool plate for firing the ceramic material of the present embodiment.

Examples of the rod-like portions arranged in parallel with and away from one another include arrangement methods shown in FIGS. 5A and 5B. After laterally arranging rod-like portions 9 at equal intervals and in parallel with one another on the back surface side as shown in FIG. 5A, rod-like portions 9 are vertically arranged on the rod-like portions shown in FIG. 5A at equal intervals and in parallel with one another on the front surface side as shown in FIG. 5B, and the portions are integrally formed by using a mold to obtain a joined structure, so that the kiln tool plate for firing the ceramic material can be formed as shown in FIG. 1. It is to be noted that the forming mold may be obtained by dividing a mold used for typical casting of mud such as gypsum plaster into two pieces in a plate thickness direction. When higher accuracy is demanded, a porous plastic material may be used.

It is to be noted that the forming method or the joining method is not limited to the above method, and the kiln tool plate for firing the ceramic material may be formed by casting or the like.

The sectional shape of this rod-like portion can preferably be selected from the group consisting of a quadrangular shape, a trapezoidal shape, a curved shape and a triangular shape. When the sectional shape of the rod-like portion can appropriately be selected from the group consisting of the quadrangular shape, the trapezoidal shape, the curved shape and the triangular shape, the present embodiment can easily be formed. In addition, the fired article can be obtained in accordance with the demanded characteristics thereof while exerting the effect of the present invention.

Specifically, when the rod-like portion has the above sectional shape, examples of the shape of the projecting portion constituting a part of the uneven conformation include projecting shapes shown in FIGS. 3A to 3E. Furthermore, examples of the sectional shape of the recess portion include the sectional shapes of a groove such as a V-shaped groove or a U-shaped groove having a slope gradient formed at an acute angle or an obtuse angle, a groove having a slope provided with a stepped portion, a recess portion having an inner bottom provided with opening areas, holes or the like, and a recess portion having a horizontally symmetric or horizontally asymmetric slope (gradient). When the sectional shape of the rod-like portion can be selected from the above group, a desirable uneven conformation can preferably easily be formed.

[1-2] Back Surface:

The back surface in the present embodiment is the surface formed on a side opposite to the front surface of the firing kiln tool plate, and is further provided with opening areas. The weight of the firing kiln tool plate and the weight of the article to be fired are added to this back surface, and hence the back surface is required to have the ease of supporting from the downside and stability, and further to have durability against the weight or shock and the like. However, this ease of supporting from the downside or the stability can be supplemented by a known fixing tool or fixing method, and hence the ease of supporting from the downside or the stability is not strictly demanded.

Moreover, the uneven conformation is preferably imparted to the back surface in the present embodiment. The uneven conformation imparted (formed) onto the back surface together with the uneven conformation on the front surface side can suppress the ratio of the weight of the kiln tool with respect to that of a product such as the fired article, and can decrease losses from the aspect of energy saving. Moreover, the atmosphere is not easily confined, and heat applied during the firing can sufficiently be conducted to the whole fired article, for example, the honeycomb structure or the like, whereby the fluctuation can be suppressed.

In the same manner as in the recess portions formed on the front surface side, examples of recess portions constituting this uneven conformation include a groove such as a V-shaped groove or a U-shaped groove having a slope gradient formed at an acute angle or an obtuse angle, a groove having a slope provided with a stepped portion, a recess portion having an inner bottom provided with opening areas, holes or the like, and a recess portion having a horizontally symmetric or horizontally asymmetric slope (gradient). Moreover, in the same manner as in the projecting portions formed on the front surface side, examples of projecting portions include projecting portions having shapes such as a triangular shape, a quadrangular shape, a round shape and an elliptic shape. In this way, the recess portions and projecting portions are appropriately selected as required to impart the uneven conformation to the back surface side, whereby the ratio of the weight of the kiln tool with respect to the product weight can be suppressed, and losses can be decreased from the aspect of energy saving. Furthermore, the atmosphere is not easily confined, and the heat applied during the firing can sufficiently easily be conducted to the whole fired article, for example, the honeycomb structure.

Examples of the shape of the projecting portion of the uneven conformation include a quadrangular shape, a trapezoidal shape, a triangular shape, an elliptic shape and a polygonal shape as shown in FIGS. 3A to 3E.

Moreover, the opening areas are formed in the back surface. The opening areas are formed on the back surface side in the same manner as in the front surface side, whereby when a gas such as a binder gas is generated during the firing, new gas loopholes are added to the above loopholes on the front surface side, and can promote the discharge of the gas together with the above opening areas on the front surface side. Furthermore, the atmosphere can sufficiently be applied to the honeycomb structure.

The opening areas are more preferably formed in the recess portions, and further preferably formed in the inner bottoms of the recess portions. In a case where the opening areas are formed in the recess portions, the spaces of the recess portions can be enlarged during the firing as compared with a case where the opening areas are formed in the projecting portions. The gas can easily be discharged to the outside of the honeycomb structure by a convective phenomenon or the like which occurs in the spaces. In addition, heat transmission, convective heat conduction, radiant heat conduction and the like can be performed with a good balance, respectively, and the effect of the present invention can be exerted.

Furthermore, the opening areas formed on the back surface side are preferably formed to be communicated with the opening areas formed on the front surface side. That is, when the opening areas formed on the back surface side are communicated with the opening areas formed on the front surface side specifically in the same manner as in the opening areas $7a$ and $7b$ shown in FIG. 4A, the opening areas on the front surface side and back surface side constitute a so-called one linked space. For example, convection or the like occurs from the recess portions on the front surface side to the recess portions on the back surface side during the burning, and the convection easily promotes the discharge of the gas to the outside. Therefore, any gas is not confined in the honeycomb structure, and temperature can uniformly be controlled. In addition, the contact area can be decreased to prevent the deformation. Furthermore, the atmosphere is easily applied to a fired article such as the honeycomb structure. It is to be noted that reference numerals $5a$ shown in FIG. 4A indicate the projecting portions.

It is to be noted that specific examples of the opening areas formed on the back surface side so as to be communicated with the opening areas formed on the front surface side additionally include examples shown in FIGS. 4B to 4E. However, the present invention is not limited to such constitutions. Needless to say, any constitution is included in the present invention as long as the opening areas formed on the back surface side are formed to be communicated with the opening areas formed on the front surface side. It is to be noted that reference numerals $5b$, $5c$, $5d$ and $5e$ shown in FIGS. 4B to 4E indicate the projecting portions.

As shown in, for example, FIG. 4A, when the uneven conformation including quadrangular shapes (the uneven conformation including the projecting portions $5a$ formed as shown in FIG. 4A) is imparted to the back surface and the opening areas $7b$ are formed in the recess portions, owing to the uneven conformation together with the uneven conformation including quadrangular shapes formed on the front surface side (the uneven conformation including the projecting portions $5a$ formed as shown in FIG. 4A) and the opening areas $7a$, any gas is not confined in the honeycomb structure, and an excessive temperature rise can be controlled. Moreover, a cooling effect is also exerted, and hence contracting deformation does not easily occur. Furthermore, weight saving can be achieved.

Moreover, in the uneven conformation formed on the back surface side, rod-like portions are preferably arranged in parallel with and away from one another. While the rod-like portions are arranged in parallel with one another, the portions are further arranged away from one another, whereby the uneven conformation can easily be formed. Here, 'the rod-like portions are arranged in parallel with and away from one another' means that the adjacent projecting portions are arranged away from each other while arranging the projecting portions in parallel with each other, and 'arranged in parallel' means that the portions are not arranged in a vertical direction but are arranged in a horizontal direction. The projecting portions are formed in this manner, because when the projecting portions are not formed (arranged) away from one another but are attached to one another, the ratio of the weight of the kiln tool with respect to that of a product such as the fired article cannot be suppressed. Moreover, a large loss is incurred from the aspect of energy saving. Moreover, the atmosphere is not sufficiently applied over the whole honeycomb structure, and the temperature during the firing cannot be kept to be constant. Furthermore, the synergistic effect with the uneven conformation provided on the front surface side is not easily exerted. Therefore, to further exert the effect of the present invention, the rod-like portions are preferably arranged in parallel with and away from one another.

It is to be noted that a horizontal state is not strictly demanded as the above horizontal direction, and horizontality may be required to such an extent that the fired article is stably mounted.

The sectional shape of this rod-like portion can preferably be selected from the group consisting of a quadrangular shape, a trapezoidal shape, a curved shape and a triangular shape. When the sectional shape of the rod-like portion can appropriately be selected from the group consisting of the quadrangular shape, the trapezoidal shape, the curved shape and the triangular shape, the present embodiment can easily be formed. In addition, the desirable uneven conformation can appropriately be selected.

When the rod-like portion has the above sectional shape, examples of the sectional shape of the projecting portion include the projecting shapes shown in FIGS. 3A to 3E. Furthermore, examples of the sectional shape of the recess portion include the sectional shapes of a groove such as a V-shaped groove or a U-shaped groove having a slope gradient formed at an acute angle or an obtuse angle, a groove having a slope provided with a stepped portion, a recess portion having an inner bottom provided with opening areas, holes or the like, and a recess portion having a horizontally symmetric or horizontally asymmetric slope (gradient). Thus, when a rod-like cross section can selectably be formed in a desirable shape, a desirable projecting or recess portion can preferably easily be formed.

[1-3] Relation between Front Surface and Back Surface:

The opening areas are formed in first recess portions having a recess shape formed on the front surface side, and formed in second recess portions having a recess shape formed on the back surface side. Moreover, communication pores are preferably formed so as to connect the first recess portions to the second recess portions. When the opening areas of the recess portions on the front surface side are communicated with those on the back surface side, the gas is further easily discharged by a convective phenomenon or the like which occurs in the spaces of the recess portions during the burning. Moreover, the temperature can be made uniform, and the contact area can be decreased, thereby preventing the deformation. Furthermore, the atmosphere is easily applied to a fired article such as the honeycomb structure, and the cooling effect after the firing can preferably be expected.

Figure 4B:
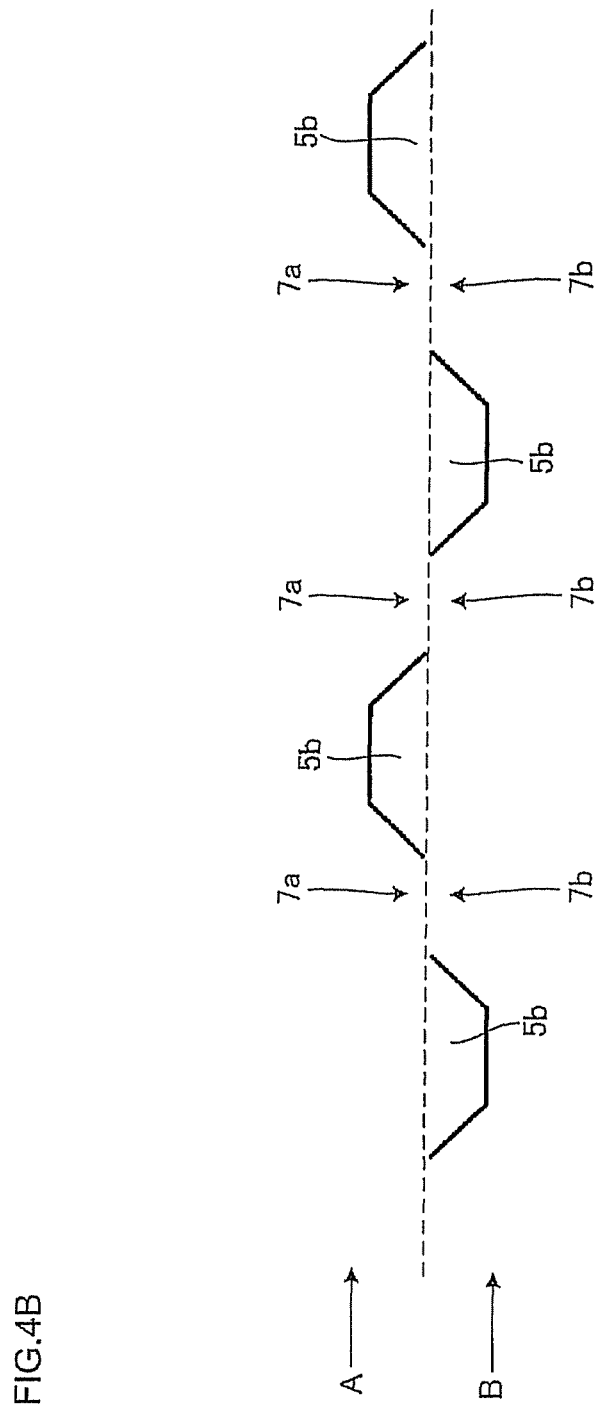
FIG. 4B is an exemplary diagram and a sectional view showing one example of an uneven conformation shown in FIG. 4A.
Figure 4E:
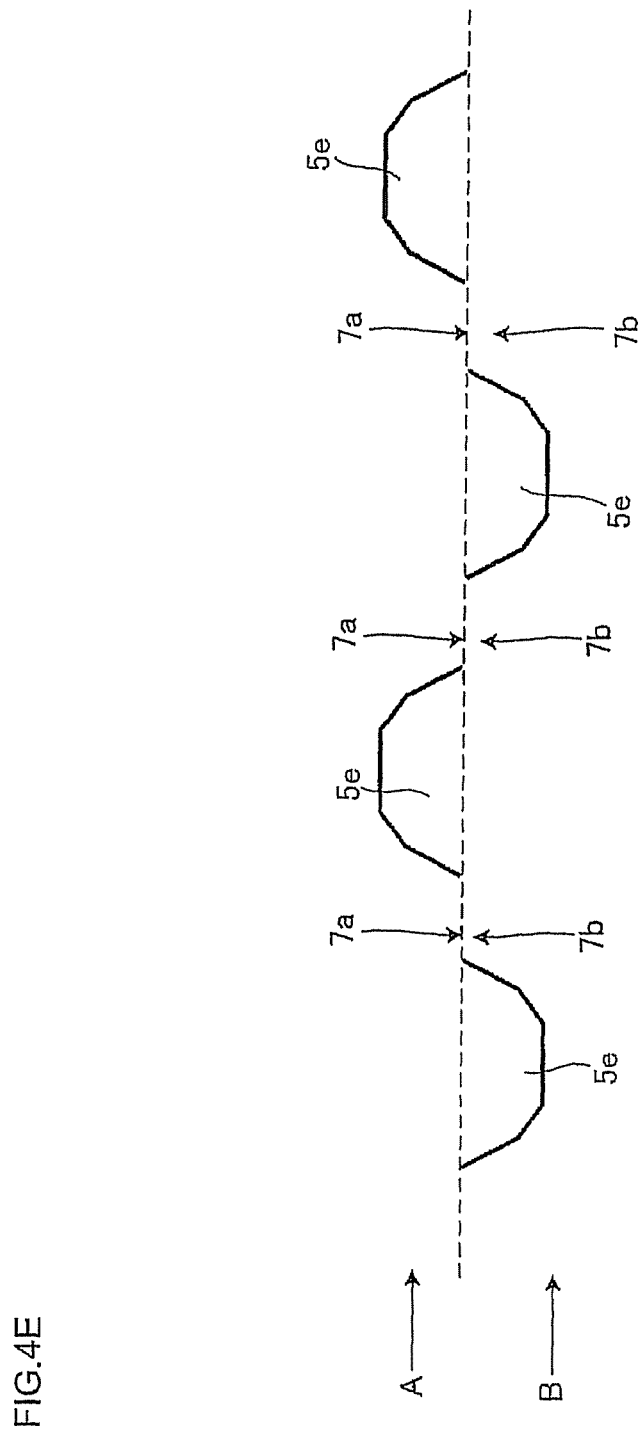
FIG. 4E is an exemplary diagram and a sectional view showing a further example of the uneven conformation shown in FIG. 4A.

Moreover, the arrangement angle of the rod-like portions is shifted, whereby the uneven conformation on the front surface side and the uneven conformation on the back surface side are preferably shifted from each other. Here, 'the arrangement angle of the rod-like portions is shifted' indicates that the rod-like portions arranged on the front surface side do not correspond to the rod-like portions arranged on the back surface side in a vertical direction or that the projecting portions arranged on the front surface side and back surface side in the vertical direction do not have a so-called back-to-back state on the front and back surfaces. That is, it is meant that when a boundary portion between the front surface side and the back surface side of the kiln tool plate for firing the ceramic material is a reference line C-C' and the plate is folded along the reference line C-C', the uneven conformation formed on the front surface side is not superimposed on the uneven conformation formed on the back surface side (see FIG. 4A). Other examples of the relation of the uneven conformation between the front surface side and the back surface side include relations shown in FIGS. 4B to 4D. As shown in FIG. 4B, for example, the opening areas between adjacent rod-like portions in the inner bottoms are smaller than adjacent surface areas respectively formed in the inner bottoms within each of the recessed portions, with the total area of the opening areas is less than the total area of the surface areas.

In other words, if the uneven conformations on the front surface side and the back surface side are formed to correspond to each other in the vertical direction, the thickness of the kiln tool plate for firing the ceramic material accordingly increases, and the ratio of the weight of the kiln tool with respect to that of a product such as the fired article is not easily suppressed. Moreover, a large loss is incurred from the aspect of energy saving. Furthermore, the atmosphere is not sufficiently applied and is not easily confined, and the heat applied during the firing is not sufficiently conducted to the whole fired article, for example, the honeycomb structure, whereby the fluctuation of the obtained honeycomb structure increases. Moreover, the kiln tool plate has poor thermal shock resistance, creep resistance and strength at high temperature. Therefore, the above constitution is preferably employed.

It is to be noted that another preferable configuration is a kiln tool plate for firing a ceramic material in which the arrangement angle of rod-like portions is not shifted and, for example, square members arranged on the front surface side have a shape, width dimension and length dimension different from those of square members arranged on the back surface side. When such a constitution is employed, an uneven conformation on the front surface side is different from an uneven conformation on the back surface side, and opening areas formed on the respective sides can be shifted. However, forming becomes troublesome. In addition, the number of parts increases, and a forming cost easily increases. Therefore, it is preferable for the sake of convenience that the arrangement angle of the rod-like portions is shifted so as to shift the uneven conformation on the front surface side from the uneven conformation on the back surface side.

More preferably, the rod-like portions are formed so as to be arranged at positions of 30 to 60 degrees with respect to the long axis of the kiln tool plate for firing the ceramic material. When the rod-like portions are arranged at a desirable angle with respect to the long axis of the kiln tool plate for firing the ceramic material, durability does not deteriorate while achieving weight saving. Furthermore, the kiln tool plate can be provided with the thermal shock resistance, creep resistance and high strength at high temperature.

Here, 'the positions of 30 to 60 degrees with respect to the long axis of the kiln tool plate for firing the ceramic material' indicate the positions in a range of 30 to 60 degrees from a reference axis, in which the reference axis is one long side of the kiln tool plate for firing the ceramic material in a longitudinal direction. For example, FIG. 6A is an exemplary diagram showing that the rod-like portions 9 are arranged in parallel with one another on the front surface side (or the back surface side). Character X in FIG. 6A indicates the short axis (the width direction) of the kiln tool plate for firing the ceramic material. Moreover, character Y indicates the long axis (the length direction) of the kiln tool plate for firing the ceramic material. When the rod-like portions 9 are arranged in parallel with one another along the short axis X and the long axis Y as shown in FIG. 6A, the rod-like portions 9 can be arranged at the positions shown in FIG. 6A.

On the other hand, when as shown in FIG. 6B, the rod-like portions are arranged along a long axis Y2 while regulating a shown angle α to the above desirable angle with respect to the long axis, the rod-like portions 9 can be arranged in parallel with one another and in a so-called tilted state at desirable positions as shown in FIG. 6B, whereby the effect of the present invention can be exerted.

It is to be noted that when the rod-like portions are arranged at the positions of 30 to 60 degrees with respect to the long axis of the kiln tool plate for firing the ceramic material, the present invention is not limited to (1) a case where both the rod-like portions disposed on the front surface and the back surface, respectively, are arranged to be positioned at the above desirable angle, and the rod-like portions may be arranged at the above desirable angle (2) only on the front surface or (3) only on the back surface.

Figure 7A:
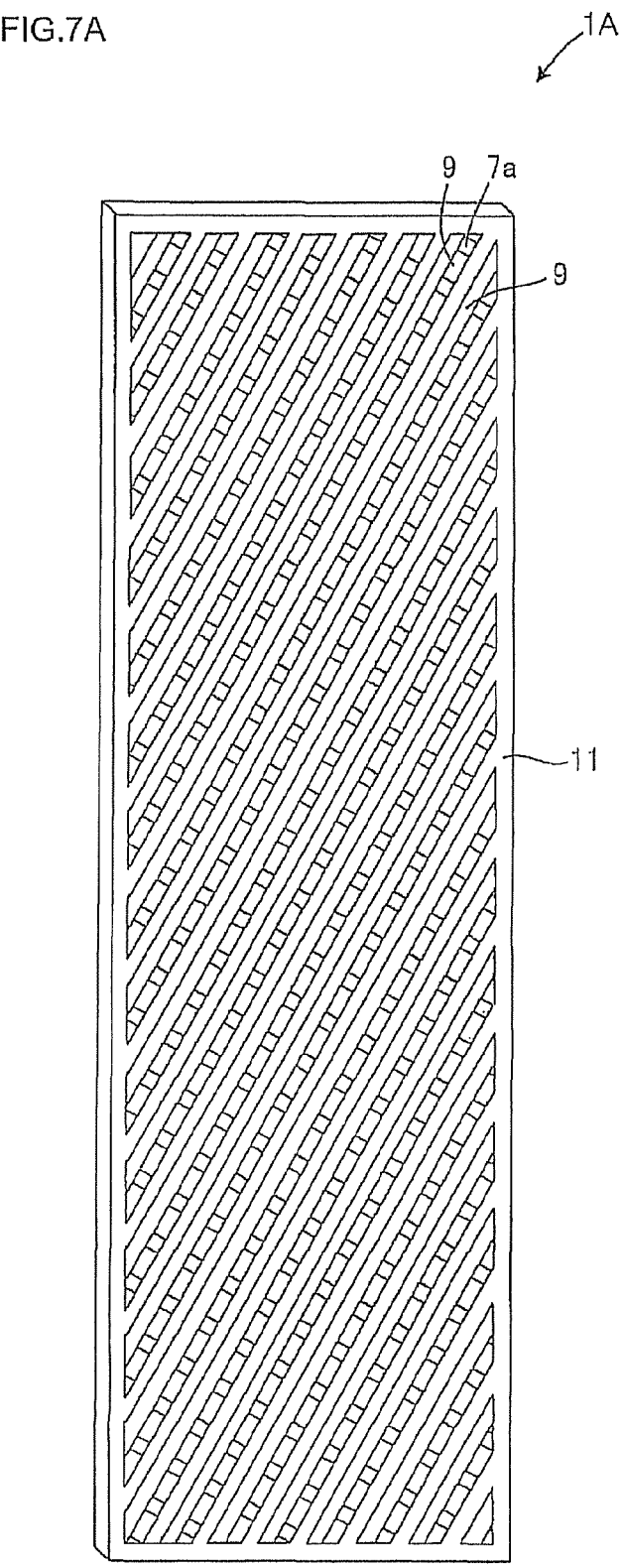
FIG. 7A is an exemplary diagram and a perspective view showing another embodiment of the kiln tool plate for firing the ceramic material of the present invention.
Figure 7B:
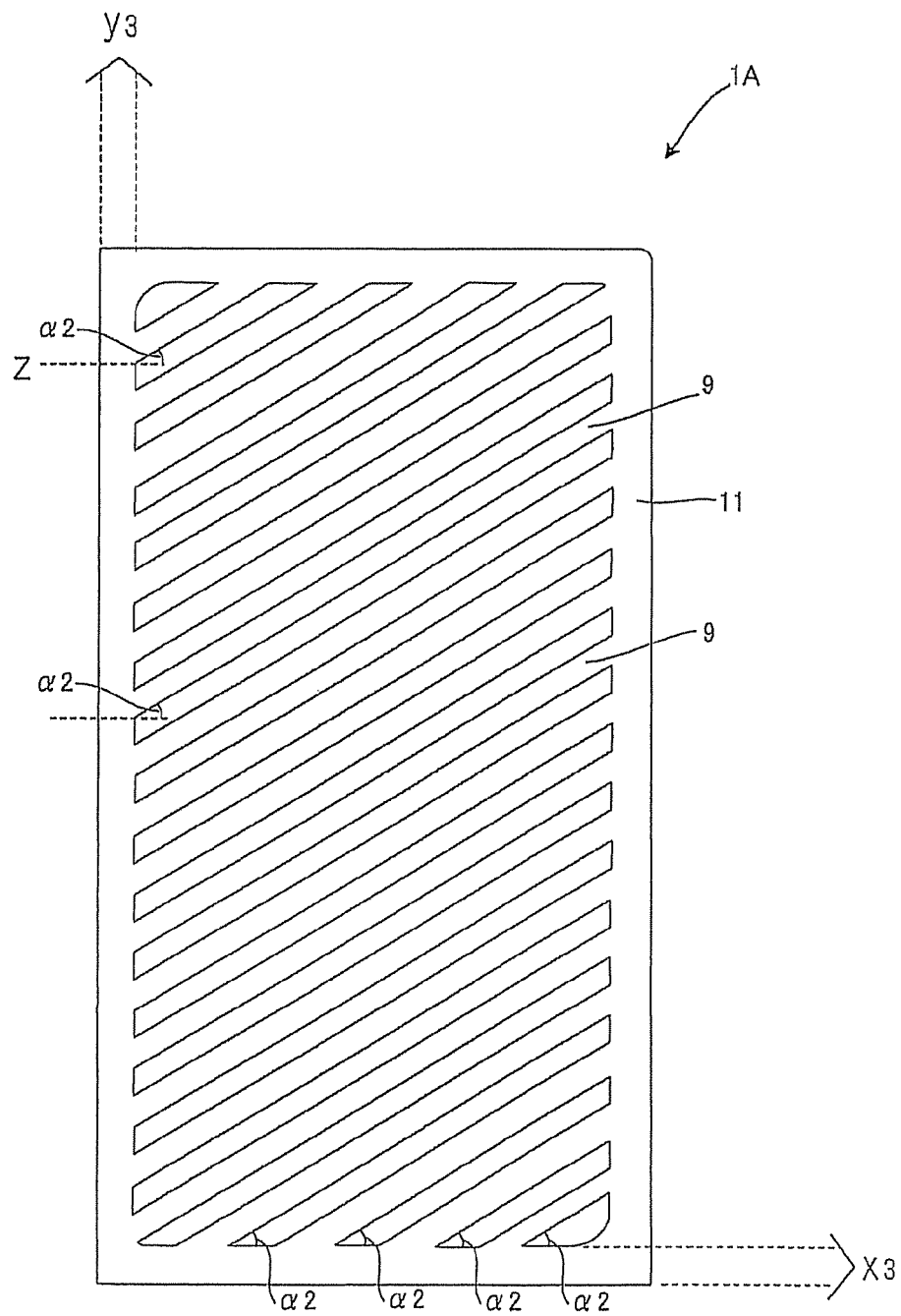
FIG. 7B is an exemplary diagram showing still another embodiment of the kiln tool plate for firing the ceramic material of the present invention, and a plan view and a perspective view showing an arrangement example of the rod-like portions arranged on the front surface side.

Furthermore, when the kiln tool plate is constituted of rod-like portions 9 each including a frame 11 as shown in FIG. 7A, an arrangement angle can desirably be regulated as follows. As shown in, for example, FIG. 7B, a virtual line Z parallel to a short axis X3 is drawn on the basis of a long axis Y3, and rod-like portions are arranged (tilted) at a desirable angle α2 from the virtual line Z, whereby a ceramic material firing kiln tool plate 1A is obtained.

Moreover, opening areas formed in first and second recess portions, respectively, are more preferably formed so as to be shifted from one another while being communicated with one another. When the respective opening areas are communicated with one another but shifted from one another, weight saving is achieved, but durability does not deteriorate. Moreover, heat transmission, convective heat conduction and radiant heat conduction can be performed with a good balance, respectively. In addition, temperature control is easily performed, and the effect of the present invention can universally be exerted also in thermal shock resistance, creep resistance and high strength at high temperature. Furthermore, since the cooling effect is also exerted, the contracting deformation does not easily occur.

Figure 8:
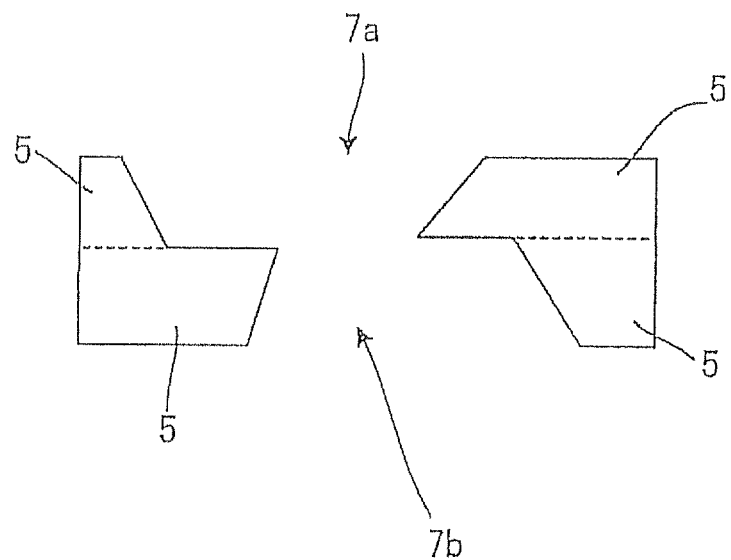
FIG. 8 is an exemplary diagram showing a further embodiment of the kiln tool plate for firing the ceramic material of the present invention, and a diagram schematically showing that opening areas formed on the front surface side and back surface side are communicated with each other.

Specific examples of opening areas formed in first and second recess portions, respectively, to be communicated with each other but shifted from each other include opening areas shown in FIG. 8. As shown in this diagram, an opening area 7*a* formed in the first recess portion on the front surface side and an opening area 7*b* formed in the second recess portion on the back surface side are communicated with each other, but are not completely matched, and are formed to be shifted from each other, whereby the effect of the present invention can be exerted.

Figure 9:
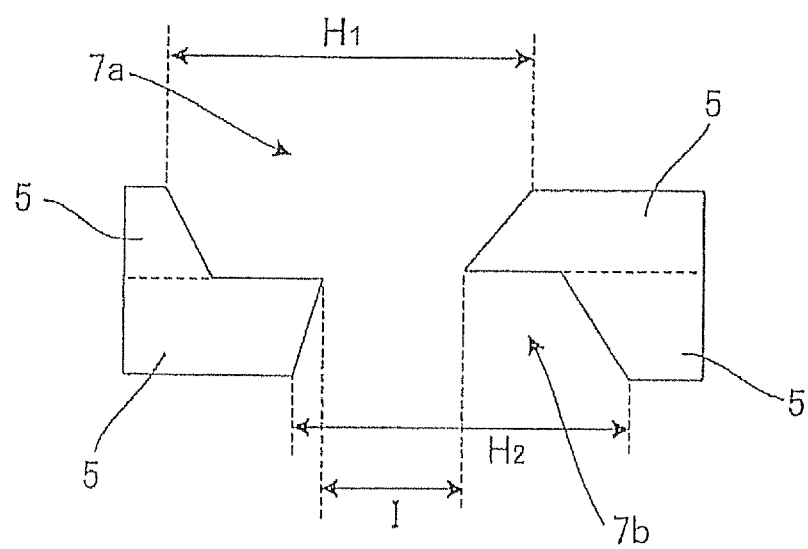
FIG. 9 is an exemplary diagram showing a further embodiment of the kiln tool plate for firing the ceramic material of the present invention, and a diagram schematically showing that the opening areas formed on the front surface side and back surface side are communicated with each other.

Further, when a value obtained by dividing a solid volume by a volume calculated from the maximum outer diameter dimension is defined as a solid volume ratio, and when the area of a communication pore is defined as a communication opening ratio, it is preferable that the solid volume ratio is 5 to 80 mass %, the communication opening ratio is 20 to 80%, and the contact area of one surface which comes in contact with the article to be fired is 2 to 80%. Specifically, as shown in FIG. 9, when a value obtained by dividing the opening area 7*a* formed on the front surface side by an area of the front surface side is defined as a front surface opening ratio H1, a value obtained by dividing the opening area 7*b* formed on the back surface side by an area of the back surface side is defined as a back surface opening ratio H2, and an area of a communication pore formed by communication between the front surface side opening area 7*a* and the back surface side opening area 7*b* is defined as a communication opening ratio I, it is preferable that the solid volume ratio obtained by dividing the solid volume by the volume calculated from the maximum outer diameter dimension, the front surface opening ratio H1, the back surface opening ratio H2 and the communication pore I are respectively formed to be within the above-mentioned desired ranges.

As methods for adjusting the solid volume ratio, the opening ratio, the contact area ratio and the angle of a rod-like portion within the desired values, there are following methods.

In setting the solid volume ratio, the opening ratio, the contact area ratio and the angle of the rod-like portion, they may be accurately set on the basis of a stress-strain speed and an oxidation speed of a material used in the present invention at each of temperatures while considering weight/size of the article to be fired, a moisture content, an amount of an organic binder, a degreasing time, the highest temperature and its retention time necessary for the firing, the thermal area and the like. As an easy method, values of the solid volume ratio, the opening ratio, the contact area ratio and the angle of a rod-like portion are preferably set so that a ratio of the stress value Y due to a weight of the article to be fired and a self weight of a kiln tool plate in the present invention to the fracture strength X in the shape of the kiln tool of the present invention and at the highest firing temperature is three times or more (X>3Y). Consequently, it is possible to suppress the warp of the kiln tool to values within such ranges as shown in Tables 1 to 3 (e.g., the amounts of creep deformation (warp) are suppressed to less than 3 mm by thirty firing operations as shown in Examples 3, 4, 5, 11, 12, 13, 16, 17 and 18 which will be described later).

Here, when the value of X is excessively increased, the warp of the kiln tool decreases, but the weight saving (porous) which is one of the objects of the present invention is hampered. As the result of the investigation of the characteristics of a kiln tool plate material containing SiC in a predetermined range, especially a stress-strain speed at each temperature and the shape of the kiln tool plate, when the value obtained by dividing the volume by the volume calculated from the maximum outer diameter dimension is defined as the solid volume ratio and the area of each communication pore is defined as the communication opening ratio, the solid volume ratio is in a range of 5 to 80% and the communication opening ratio is in a range of 20 to 80%. Furthermore, in a case where there is used the kiln tool plate for firing the ceramic material having the contact area of one surface which comes in contact with the fired article in a range of 2 to 80%, it is possible to design the kiln tool plate which can satisfactorily sinter the fired article in a range of 20Y>X>3Y.

Moreover, the material of the kiln tool plate for firing the ceramic material preferably contains at least 50 mass % of SiC, and more preferably contains 75 mass % or more of SiC. The kiln tool plate for firing the ceramic material is requested to be made of a material such as a refractory material having a high compressive strength and a high heat resistance, and SiC is a material having high infrared emittance, excellent oxidation resistance, excellent creep resistance and high strength at high temperature, so that the effect of the present invention can be exerted.

Furthermore, as another material, 85 to 90 mass % of SiC and 15 to 10 mass % of $SiO_2$ are preferably contained, and 80 to 90 mass % of SiC and 5 to 20 mass % of $SiO_2$ are more preferably contained. Since SiC is the material having the high infrared emittance, excellent oxidation resistance, excellent creep resistance and high strength at high temperature, it can be considered that the material is suitable as the kiln tool material used at the high temperature. Furthermore, SiC synthesized by supplying a large current through the powder of $SiO_2$ and C at 2000° C. or a higher temperature is a material which noticeably generates $CO_2$ and which incurs a large power consumption, and the amount of the material to be used is preferably small from the viewpoint of energy saving. Therefore, such a desirable material can preferably be used to decrease the amount of SiC to be used.

Moreover, as another material, preferably at least 90 mass %, more preferably 95 mass % or more of SiC and $Si_3N_4$ in total is contained. According to such a constitution, the kiln tool plate can bear the weight of the fired article or the like, and can resist the firing at the high temperature in a firing furnace. The kiln tool plate for firing the ceramic material is requested to be constituted of a material such as the refractory material having high compressive strength and high heat resistance, and SiC is the material having the high infrared emittance, excellent oxidation resistance, excellent creep resistance and high strength at high temperature, so that the effect of the present invention can be exerted.

It is to be noted that examples of this forming method include a method of first kneading and casting the predetermined amounts of SiC powder, Si powder, binder and water or organic solvent to obtain a formed article having a desirable shape; drying this formed article at 90° C.; and firing the article in the atmosphere of nitrogen to generate $Si_3N_4$ by a reaction between Si and nitrogen, thereby manufacturing a composite material of silicon carbide and silicon nitride.

[1-4] Constitution of another Kiln Tool Plate for Firing Ceramic Material:

There is not any special restriction on the size of the kiln tool plate for firing the ceramic material. A suitable size is preferably selected in accordance with the weight of the honeycomb structure to be mounted or the like as required. For example, a kiln tool plate having a typical shelf size of a vertical size of 300 to 700 mm×a lateral size of 300 to 700 mm×a thickness of 5 to 10 mm can suitably be used, but the present invention is not limited to such a size, and a suitable dimension can be employed as required.

[2] Use Method:

The kiln tool plate for firing the ceramic material in the present embodiment is used as a part of a shelf assembly as shown in FIGS. 10A and 10B. However, the present invention is not limited to such a shelf assembly, and a known shelf assembly may be used as long as the shelf assembly has a structure in which the kiln tool plate for firing the ceramic material in the present embodiment is easily supported from the downside.

When, for example, the shelf assembly shown in FIG. 10A is used, a shelf assembly 12 includes supports 13, and bridging members 15 as required, and the kiln tool plate for firing the ceramic material of the present embodiment is mounted and used on a mounting base 14 (see FIG. 11) formed on the supports. It is to be noted that FIG. 10A is an exemplary diagram showing a state before the kiln tool plate for firing the ceramic material is attached. Moreover, when, for example, the shelf assembly shown in FIG. 10B is used, a shelf assembly 16 includes supports 17, and mounting bases 18 disposed on the supports as required, and the ceramic material firing kiln tool plates 1 of the present embodiment are mounted and used on the mounting bases. It is to be noted that in the shelf assemblies shown in FIGS. 10A and 10B, the ceramic material firing kiln tool plates of the present embodiment and the supports may alternately be stacked to constitute the shelf assembly. Furthermore, when a known fixing tool, a known fixing method or the like is used as required, the kiln tool plates can preferably stably be mounted.

Figure 11:
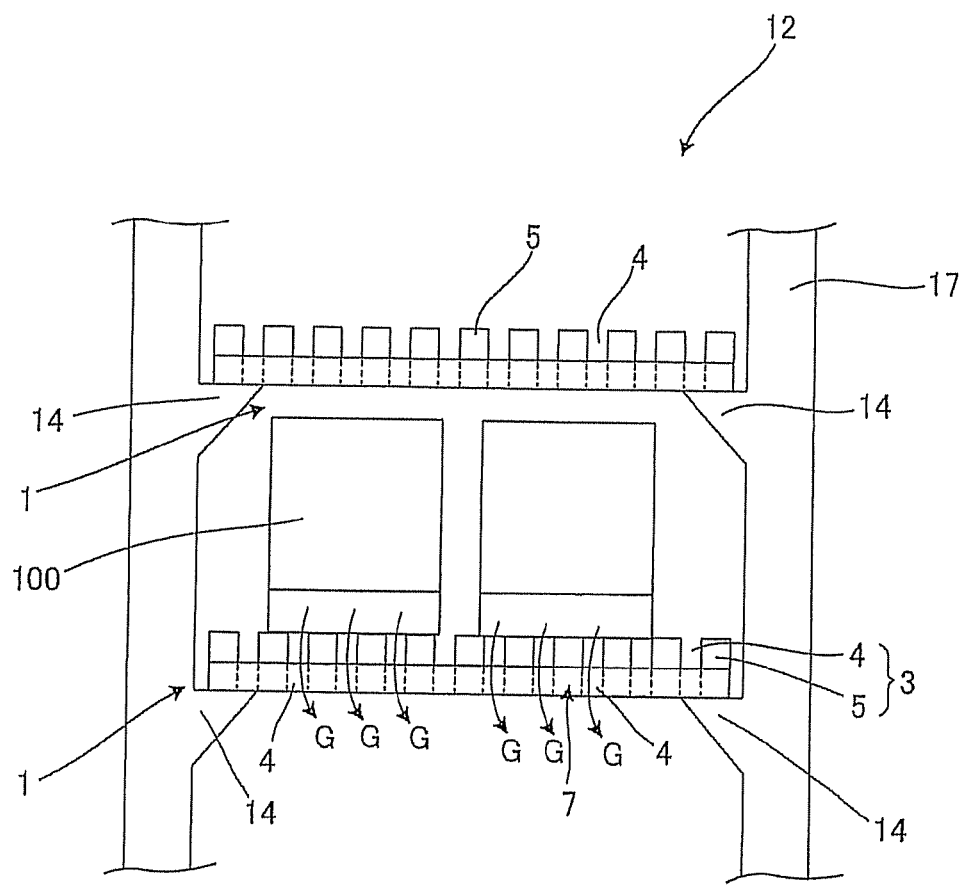
FIG. 11 is an exemplary diagram showing that the kiln tool plates for firing the ceramic material of the present embodiment are mounted on the shelf assembly shown in FIG. 10A and showing that a fired honeycomb article is further mounted, and is a partially enlarged diagram.

An article to be fired such as a formed honeycomb article is mounted and fired on the kiln tool plate for firing the ceramic material. Specifically, as shown in FIG. 11, a formed honeycomb article 100 is mounted and fired. Here, the kiln tool plate for firing the ceramic material of the present embodiment is provided with the uneven conformation and acquires gas permeability. Therefore, when the formed honeycomb article 100 is mounted and fired on the kiln tool plate for firing the ceramic material, gases G generated from the formed honeycomb article are not confined, but are discharged to the outside of the honeycomb article. Moreover, the contact area of the formed honeycomb article with the bottom surface of the ceramic material firing kiln tool plate 1 decreases. When the formed honeycomb article contracts during the firing, frictional resistance can be decreased, thereby minimizing the dimensional deformation of the formed honeycomb article. Furthermore, the packing efficiency of the article to be fired can be improved.

[3] Forming Method:

When the kiln tool plate for firing the ceramic material is formed of one plate-like member, the desirable uneven conformation is formed on the front surface side, and the desirable uneven conformation may be imparted (formed) onto the back surface side to form the plate. Furthermore, the opening areas on the front surface side and back surface side may be formed through the plate by use of a tool such as a drill so as to be communicated with one another.

Moreover, when the kiln tool plate for firing the ceramic material is formed by combining two members in total, i.e., one plate member on the front surface side and one plate member on the back surface side, the desirable uneven conformation is imparted to the front surface side. Moreover, after imparting the desirable uneven conformation to the back surface side, the plate member on the front surface side and the plate member on the back surface side are attached to each other so that the above opening areas are communicated with one another, to form the kiln tool plate for firing the ceramic material. When the plate is formed in this manner, an opening area shape can be formed so that the heat transmission, convective heat conduction and radiant heat conduction can be performed with a good balance, respectively. In consequence, the effect of the present invention can further be exerted. It is to be noted that when the opening areas to be provided on the front surface side and back surface side are beforehand formed, the opening areas are preferably positioned in desirable portions so as to be communicated with one another.

Furthermore, when the kiln tool plate for firing the ceramic material is formed by combining two members in total, i.e., one plate member on the front surface side and one plate member on the back surface side, the uneven conformations are imparted to the front surface side and back surface side. After attaching the members to each other, the opening areas may be formed. When the kiln tool plate is formed in this manner, the opening areas on the front surface side can easily be communicated with the opening areas on the back surface side, whereby forming processes can preferably be simplified, and fluctuations can preferably be decreased.

It is to be noted that the constitution of the kiln tool plate for firing the ceramic material is not limited to the constitution of two members in total, i.e., one plate member on the front surface side and one plate member on the back surface side. As long as the effect of the present invention is exerted, in addition to the one plate member on the front surface side and the one plate member on the back surface side, another member may be interposed as an intermediate layer between the front surface side and the back surface side.

As a method for forming the uneven conformations on the front surface and back surface of the kiln tool plate for firing the ceramic material, a formed article having a desirable shape can be obtained by casting. In the case of the casting, the front surface and the back surface can constitute a three-dimensional structure.

By use of a casting mold characterized in that a removal face of a flat plate removal portion in a thickness direction has one or two tilts from the surface of the plate to the center thereof, a shape suitable for a releasable mold is easily obtained, and the strength of a cast material can be increased.

Moreover, when the front surface side and the back surface side have the same constitution, either surface can be used as the front surface or the back surface. The honeycomb structure can be mounted on the surface, whether the surface is the front surface or the back surface. In consequence, convenience preferably improves.

EXAMPLES

Hereinafter, the present invention will further specifically be described with respect to examples, but the present invention is not limited to the examples. It is to be noted that hereinafter, '%' in the examples and comparative examples indicates mass %, unless otherwise specified. Moreover, various evaluations and measurements in the examples were performed by methods described hereinafter.

[1-1] Bulk Specific Gravity:

As to a bulk specific gravity, after drying a material in a drying chamber at 80° C. for 12 hours, a dry mass W1 was measured. Afterward, the material was boiled in water at 100° C. for one hour, and cooled down to ordinary temperature in the water. Subsequently, after measuring an in-water mass W2 and wiping the whole material with lightly squeezed gauze, a water-containing weight W3 was measured. The bulk specific gravity was calculated from these values W1, W2 and W3.

[1-2] Bending Strength:

A breaking weight was measured by a three-point bending test (a crosshead speed of 0.5 mm/minute) with a span of 380 mm in conformity with JIS R1601, thereby measuring the bending strength of a ceramic material firing kiln tool plate after firing.

[1-3] Fired Product Strength:

The fired product strength of a formed honeycomb article was measured. Specifically, a predetermined shape (0.3×4× 40 mm) was cut out of the fired honeycomb article, and the strength thereof was measured by the three-point bending test in conformity with JIS R1601.

[1-4] Firing Yield:

The firing yield of the formed honeycomb article was measured. Specifically, it was checked visually or with a loupe or the like whether or not the crack of the formed honeycomb article was generated, and a frequency with which any crack was not found was obtained as the yield.

[1-5] Firing Situation of Kiln Tool Plate for Firing Ceramic Material:

Furthermore, the firing situation of the kiln tool plate for firing the ceramic material was checked. Moreover, the firing was repeated 30 times, and a creep deformation ratio was measured. Specifically, the diagonal bending amount of the kiln tool plate for firing the ceramic material was measured with a thickness gauge.

[2-1] Preparation of Ceramic Material Firing Kiln Tool Plates of Examples 1 to 20:

There were beforehand prepared (1) ceramic material firing kiln tool plates of Examples 1 to 10 containing 75 mass % of SiC, 24 mass % of $Si_3N_4$ and 1 mass % of $SiO_2$, having a bulk specific gravity of 2.8 g/cc, a bending strength of 200 MPa and a size of a length of 400 mm in a longitudinal direction, a length of 100 mm in a short direction and a thickness of 8 mm, and having a solid volume ratio, an opening ratio, a contact area ratio, a rod-like portion sectional shape and a rod-like portion angle shown in Tables 1 and 2; (2) ceramic material firing kiln tool plates of Examples 11 to 15 containing 90 to 85 mass % of SiC and 10 to 15 mass % $SiO_2$, having a bulk specific gravity of 2.8 to 2.75 g/cc, a bending strength of 150 to 50 MPa and a size of a length of 400 mm in a longitudinal direction, a length of 100 mm in a short direction and a thickness of 8 mm, and having a solid volume ratio, an opening ratio, a contact area ratio, a rod-like portion sectional shape and a rod-like portion angle shown in Table 2; and (3) ceramic material firing kiln tool plates of Examples 16 to 20 containing 95 to 80 mass % of SiC and 5 to 20 mass % of Si, having a bulk specific gravity of 3 g/cc, a bending strength of 250 MPa and a size of a length of 400 mm in a longitudinal direction, a length of 100 mm in a short direction and a thickness of 8 mm, and having a solid volume ratio, an opening ratio, a contact area ratio, a rod-like portion sectional shape and a rod-like portion angle shown in Table 3, respectively.

[2-2] Preparation of Ceramic Material Firing Kiln Tool Plates of Comparative Examples 1 to 4:

There were beforehand prepared ceramic material firing kiln tool plates of Comparative Examples 1 to 4 containing 75 mass % of SiC, 24 mass % of $Si_3N_4$ and 1 mass % of $SiO_2$, having a bulk specific gravity of 2.8 g/cc, a bending strength of 200 MPa and a size of a length of 400 mm in a longitudinal direction, a length of 100 mm in a short direction and a thickness of 8 mm, and having a solid volume ratio, an opening ratio, a contact area ratio, a rod-like portion sectional shape and a rod-like portion angle shown in Table 3, respectively.

[3] Preparation of Shelf Assembly:

There were beforehand prepared supports containing 75% of silicon carbide and 25% of silicon nitride and having a bulk specific gravity of 2.5 to 3.0 g/cc and a size of a vertical size of 60×a lateral size of 40 (80)×a total length of 1800 mm (with the proviso that the above numeric value within parentheses is a dimension including a mount base on which a first bridging member was mounted (a projecting portion of the support on which the first bridging member was mounted)); square-post-like first bridging members containing 75% of silicon carbide and 25% of silicon nitride and having a bulk specific gravity of 2.5 to 3.0 g/cc and a size of a vertical size of 40×a lateral size of 40 mm×a total length of 1300; and square-post-like second bridging members having a size of a vertical size of 40×a lateral size of 40 mm×a total length of 1700 mm, respectively. Furthermore, one square post having a size of 1300 mm was disposed on the left side, and another square post having a size of 1300 mm was disposed in parallel with the left post on the right side. Next, six square posts having a size of 1700 mm were arranged in a vertical direction on the left and right square posts having the size of 1300 mm, as if they had been arranged in double crosses. Here, to arrange the firing kiln tool plates of the examples and comparative examples having a size of 400 mm×100 mm, the positional relation of the six square posts having the size of 1700 mm (a sectional size of 40×40 mm) was the square post (1) 40 mm+interval (1) 200 mm+square post (2) 40 mm+interval (2) 20 mm+square post (3) 40 mm+interval (3) 200 mm+square post (4) 40 mm+interval (4) 20 mm+square post (5) 40 mm+interval (6) 200 mm+square post (6) 40 mm. Moreover, a shelf assembly was prepared so that the end of each of the left and right 1300 mm square posts had an allowance of 10 mm.

It is to be noted that examples of a method for manufacturing these supports include a method of kneading and casting the predetermined amounts of SiC powder, Si powder, binder and water or organic solvent to obtain a formed article having a desirable shape; drying this formed article at 90° C.; and firing the article in the atmosphere of nitrogen to generate $Si_3N_4$ by a reaction between Si and nitrogen, thereby manufacturing a composite material of silicon carbide and silicon nitride.

[4] Preparation of Formed Honeycomb Article Before Fired (a Green Honeycomb Structure):

As a material, a cordierite forming material containing talc, kaolin and alumina as main components was blended with water and a binder, dispersed, mixed and kneaded to obtain a forming material. The material was extruded into a columnar shape by a clay kneader, followed by extrusion forming by an extrusion forming machine, to obtain a green honeycomb structure (the formed honeycomb article) having a size of 0320 mm×300 mL and including a large number of cells arranged in an axial direction.

After drying the above green formed honeycomb articles, the green honeycomb structures were fired by using the ceramic material firing kiln tool plates of Examples 1 to 20 and Comparative Examples 1 to 4, to obtain the fired honeycomb articles. The results are shown in Tables 1 to 3. It is to be noted that as to the measurement results of 'the creep deformation amount of the setter after 30 firing times' shown in Tables 1 to 3, when the amount is less than 3 mm, '-' is only shown, and the amount is not actually measured.

TABLE 1

| | | | Unit | Example 1 | Example 2 | Example 3 | Example 4 | Example 5 | Example 6 | Example 7 |
|---|---|---|---|---|---|---|---|---|---|---|
| Setter | Composition | SiC | mass % | 75 | 75 | 75 | 75 | 75 | 75 | 75 |
| | | $Si_3N_4$ | mass % | 24 | 24 | 24 | 24 | 24 | 24 | 24 |
| | | Si | mass % | — | — | — | — | — | — | — |
| | | $SiO_2$ | mass % | 1 | 1 | 1 | 1 | 1 | 1 | 1 |
| | Characteristics | Bulk specific gravity | — | 2.8 | 2.8 | 2.8 | 2.8 | 2.8 | 2.8 | 2.8 |
| | | Bending strength | MPa | 200 | 200 | 200 | 200 | 200 | 200 | 200 |
| | Shape | Solid volume ratio | % | 5 | 20 | 50 | 50 | 50 | 70 | 80 |
| | | Communication opening ratio | % | 20 | 40 | 50 | 50 | 50 | 30 | 20 |
| | | Contact area ratio | % | 20 | 25 | 50 | 50 | 50 | 65 | 80 |
| | | Rod-like portion sectional shape | — |  |  |  |  |  |  |  |
| | | Rod-like portion arrangement angle (with respect to long axis of setter) | ° | 60 | 60 | 60 | 45 | 30 | 60 | 60 |
| Firing state | Fired article | Fired product strength | MPa | 20 | 21 | 20 | 20 | 20 | 21 | 19 |
| | | Firing yield | % | 100 | 100 | 100 | 100 | 100 | 100 | 100 |
| | | Situation | | No abnormality | No abnormality | No abnormality | No abnormality | No abnormality | No abnormality | No abnormality |
| | Setter | Creep deformation amount after 30 firing times | mm | — | — | 0.02 | 0.8 | 1.5 | — | — |

TABLE 2

| | | | Unit | Example 8 | Example 9 | Example 10 | Example 11 | Example 12 | Example 13 | Example 14 | Example 15 |
|---|---|---|---|---|---|---|---|---|---|---|---|
| Setter | Composition | SiC | mass % | 75 | 75 | 75 | 90 | 90 | 90 | 90 | 85 |
| | | $Si_3N_4$ | mass % | 24 | 24 | 24 | — | — | — | — | — |
| | | Si | mass % | — | — | — | — | — | — | — | — |
| | | $SiO_2$ | mass % | 1 | 1 | 1 | 10 | 10 | 10 | 10 | 15 |
| | Characteristics | Bulk specific gravity | — | 2.8 | 2.8 | 2.8 | 2.8 | 2.8 | 2.8 | 2.75 | 2.8 |
| | | Bending strength | MPa | 200 | 200 | 200 | 150 | 150 | 150 | 50 | 150 |
| | Shape | Solid volume ratio | % | 50 | 50 | 50 | 50 | 50 | 50 | 50 | 50 |
| | | Communication opening ratio | % | 60 | 60 | 60 | 60 | 60 | 60 | 60 | 60 |
| | | Contact area ratio | % | 50 | 5 | 2 | 50 | 50 | 50 | 50 | 50 |

TABLE 2-continued

| | | | Unit | Example 8 | Example 9 | Example 10 | Example 11 | Example 12 | Example 13 | Example 14 | Example 15 |
|---|---|---|---|---|---|---|---|---|---|---|---|
| | | Rod-like portion sectional shape | — |  |  |  |  |  |  |  |  |
| | | Rod-like portion arrangement angle (with respect to long axis of setter) | ° | 60 | 60 | 60 | 60 | 45 | 30 | 60 | 60 |
| Firing state | Fired article | Fired product strength | MPa | 20 | 22 | 21 | 20 | 20 | 20 | 20 | 21 |
| | | Firing yield | % | 100 | 100 | 100 | 100 | 100 | 100 | 100 | 100 |
| | | Situation | | No abnormality | No abnormality | No abnormality | No abnormality | No abnormality | No abnormality | No abnormality | No abnormality |
| | Setter | Creep deformation amount after 30 firing times | mm | — | — | — | 0.25 | 0.95 | 2.3 | — | — |

| | | | Unit | Example 16 | Example 17 | Example 18 | Example 19 | Example 20 | Comparative Example 1 | Comparative Example 2 | Comparative Example 3 | Comparative Example 4 |
|---|---|---|---|---|---|---|---|---|---|---|---|---|
| Setter | Composition | SiC | mass % | 95 | 95 | 95 | 90 | 80 | 75 | 75 | 75 | 75 |
| | | $Si_3N_4$ | mass % | — | — | — | — | — | 24 | 24 | 24 | 24 |
| | | Si | mass % | 5 | 5 | 5 | 10 | 20 | — | — | — | — |
| | | $SiO_2$ | mass % | — | — | — | — | — | 1 | 2 | 3 | 4 |
| | Characteristics | Bulk specific gravity | — | 3 | 3 | 3 | 3 | 3 | 2.8 | 2.8 | 2.8 | 2.8 |
| | | Bending strength | MPa | 250 | 250 | 250 | 250 | 250 | 200 | 200 | 200 | 200 |
| | Shape | Solid volume ratio | % | 50 | 50 | 50 | 50 | 50 | 4 | 85 | 50 | 100 |
| | | Communication opening ratio | % | 60 | 60 | 60 | 60 | 60 | 18 | 15 | 0 | 0 |
| | | Contact area ratio | % | 50 | 50 | 50 | 50 | 50 | 1 | 82 | 50 | 100 |
| | | Rod-like portion sectional shape | — |  |  |  |  |  |  |  |  | None |
| | | Rod-like portion arrangement angle (with respect to long axis of setter) | ° | 60 | 45 | 30 | 60 | 60 | 60 | 60 | 60 | 60 |

| | | | Unit | Example 16 | Example 17 | Example 18 | Example 19 | Example 20 | Comparative Example 1 | Comparative Example 2 | Comparative Example 3 | Comparative Example 4 |
|---|---|---|---|---|---|---|---|---|---|---|---|---|
| Firing state | Fired article | Fired product strength | MPa | 20 | 20 | 20 | 20 | 19 | 20 | 10 | 3 | 15 |
| | | Firing yield | % | 100 | 100 | 100 | 100 | 100 | 50 | 73 | 72 | 70 |
| | | Situation | | No abnormality | No abnormality | No abnormality | No abnormality | No abnormality | Breakage | No abnormality | No abnormality | No abnormality |
| Setter | | Creep deformation amount after 30 firing times | mm | 0.03 | 0.75 | 1.4 | — | — | — | — | — | — |

(Consideration)

As shown in Tables 1 to 3, the ceramic material firing kiln tool plates of Examples 1 to 20 and the fired articles obtained by using the plates exhibited satisfactory results. Specifically, as to the fired product strength, the fired articles obtained by using the ceramic material firing kiln tool plates of Examples 1 to 20 had the strength in a range of 19 to 22 MPa, and the firing yield was 100%. The situations of the ceramic material firing kiln tool plates of Examples 1 to 20 after the firing were checked, but any abnormality was not found in Examples 1 to 20. Furthermore, the ceramic material firing kiln tool plates of Examples 1 to 20 were fired 30 times, and then the creep deformation amounts were measured. In Examples 1, 2, 6 to 10, 14, 15, 19 and 20, any creep deformation was not found. Moreover, in Examples 3 to 5, 11 to 13 and 16 to 18, the deformation could be confirmed, but the deformation amounts were in a range of 0.02 to 2.3 mm, and the characteristics of the ceramic material firing kiln tool plates were not impaired.

On the other hand, it was eventually demonstrated that as to the ceramic material firing kiln tool plates of Comparative Examples 1 to 4 and the fired articles obtained by using the plates, the characteristics of the formed honeycomb article were noticeably impaired and could not bear continued use. Specifically, in Comparative Examples 2 to 4, as to the fired product strength, the fired articles could not bear the use. Furthermore, in Comparative Examples 1 to 4, the yield was very poor. Moreover, the situation of the ceramic material firing kiln tool plate of Comparative Example 1 was observed, and the occurrence of breakage was found.

INDUSTRIAL APPLICABILITY

A kiln tool plate for firing ceramic material of the present invention produces an excellent effect that there can be provided a kiln tool plate for firing a ceramic material which is used during the firing of an article to be fired. In the kiln tool plate for firing the ceramic material, at least uneven conformations are imparted to a front surface side on which the article to be fired is mounted and a back surface side, and opening areas are formed, whereby heat capacity decrease and cost reduction can be achieved. A contact area with the fired article is decreased to improve outgassing. Furthermore, the atmosphere can be made uniform to uniformly manufacture the fired article. Above all, the ceramic material firing kiln tool plate having excellent thermal shock resistance, creep resistance, high strength at high temperature and oxidation resistance can suitably be used.

The invention claimed is:

1. A kiln tool plate for firing a ceramic material which is used during the firing of an article to be fired,
    said kiln tool plate having alternating projecting and recessed portions that are imparted to a front surface side, on which the article to be fired is mounted, and that are imparted to an opposed back surface side by arranging rod-like portions in parallel with one another, with each of the rod-like portions having a trapezoidal sectional shape, the trapezoidal sectional shape comprising a quadrilateral having two parallel base sides of unequal length, a shorter first base side and a longer second base side, wherein the shorter first base side of each of the rod-like portions is the outermost contact surface of the front surface side and the opposed back surface side, with the outermost contact surface being a surface that is configured to contact the article to be fired, thereby providing a contact surface and balance between the article to be fired and the rod-like portions, and wherein the longer second base sides of the rod-like portions are spaced apart from one another by a distance that is equal to a height of the rod-like portions,
    said alternating projecting and recessed portions are integrally formed, with said recessed portions having inner bottoms formed by the rod-like portions disposed on the front surface side and the rod-like portions disposed on the back surface side, wherein opening areas between adjacent rod-like portions in said inner bottoms are smaller than adjacent surface areas respectively formed in said inner bottoms within each of said recessed portions, and wherein the total area of said opening areas is less than the total area of said surface areas.

2. The kiln tool plate for firing the ceramic material according to claim 1, wherein the arrangement angle of the rod-like portions on the front surface side is shifted from that of the rod-like portions on the back surface side to form said alternating projecting and recessed portions on the front surface side and the back surface side so that said alternating projecting and recessed portions are shifted from each other.

3. The kiln tool plate for firing the ceramic material according to claim 2, wherein the rod-like portions are formed so as to be arranged at positions of 30 to 60 degrees with respect to a long axis of the kiln tool plate for firing the ceramic material.

4. The kiln tool plate for firing the ceramic material according to claim 1, which contains at least 50 mass % of SiC.

5. The kiln tool plate for firing the ceramic material according to claim 1, which contains at least 90 mass % of SiC and $Si_3N_4$ in total.

6. The kiln tool plate for firing the ceramic material according to claim 1, which contains 85 to 90 mass % of SiC and 15 to 10 mass % of $SiO_2$.

7. The kiln tool plate for firing the ceramic material according to claim 1, wherein the rod-like portions disposed on the front surface side and the rod-like portions disposed on the back surface side are respectively disposed at an equal distance therebetween, and wherein respective rod-like portions on the front surface side and on the back surface side are disposed at both ends of the plate.

8. The kiln tool plate for firing ceramic material according to claim 1, wherein the height of the rod-like portions is from 5 to 10 mm.

9. The kiln tool plate for firing ceramic material according to claim 8, wherein the rod-like portions have a length from 300 to 700 mm.

10. The kiln tool plate for firing ceramic material according to claim 1, wherein the front surface side and the back surface side have the same constitution.

11. The kiln tool plate for firing ceramic material according to claim 1, wherein the kiln tool plate is configured to be integrally formed to obtain a joined structure.

12. The kiln tool plate for firing ceramic material according to claim 1, wherein the kiln tool plate is configured to be integrally formed using no adhesive to obtain a joined structure.

13. The kiln tool plate for firing ceramic material according to claim 1, wherein the kiln tool plate is configured to be integrally formed by use of a mold to obtain a joined structure.

\* \* \* \* \*